(12) United States Patent
DeVoe et al.

(10) Patent No.: US 10,867,124 B2
(45) Date of Patent: Dec. 15, 2020

(54) MANUAL ANNOTATIONS USING CLUSTERING, ANCHORING, AND TRANSFORMATION

(71) Applicant: Apple Inc., Cupertino, CA (US)

(72) Inventors: Jiva Gandhara DeVoe, Vancouver, WA (US); John Henry Sturgeon, Camas, WA (US); James Vernon Van Boxtel, Ridgefield, WA (US); Elden G. Wood, III, Portland, OR (US); Kevin Raemon Glyn Smyth, Portland, OR (US); Evan Sean Torchin, Austin, TX (US)

(73) Assignee: Apple Inc., Cupertino, CA (US)

(*) Notice: Subject to any disclaimer, the term of this patent is extended or adjusted under 35 U.S.C. 154(b) by 39 days.

(21) Appl. No.: 16/112,492

(22) Filed: Aug. 24, 2018

(65) Prior Publication Data

US 2019/0294660 A1    Sep. 26, 2019

Related U.S. Application Data

(60) Provisional application No. 62/648,301, filed on Mar. 26, 2018.

(51) Int. Cl.
*G06F 17/20* (2006.01)
*G06F 40/169* (2020.01)
(Continued)

(52) U.S. Cl.
CPC .......... *G06F 40/169* (2020.01); *G06F 40/106* (2020.01); *G06F 40/171* (2020.01)

(58) Field of Classification Search
CPC .... G06F 17/242; G06F 40/169; G06F 40/171; G06F 40/106
See application file for complete search history.

(56) References Cited

U.S. PATENT DOCUMENTS

| | | | | |
|---|---|---|---|---|
| 5,341,438 A | * | 8/1994 | Clifford | ................. G06K 9/342 382/179 |
| 5,613,019 A | * | 3/1997 | Altman | .................... G06K 9/72 382/311 |

(Continued)

OTHER PUBLICATIONS

David Bargeron et al., "Reflowing Digital Ink Annotations," Chicago Conference Proceedings, Conference on Human Factors in Computing Systems, New York, NY, ACM, US, vol. 5, No. 1, Apr. 5, 2003, pp. 386-392 (Year: 2003).*

(Continued)

*Primary Examiner* — Shahid K Khan
(74) *Attorney, Agent, or Firm* — Fletcher Yoder PC

(57) ABSTRACT

Embodiments are disclosed in which a process receives annotation inputs for annotations of a document. The annotation inputs may be grouped together into clusters based at least in part on a functional relationship between the timing of annotation inputs and the paths of the annotation inputs across an electronic display. The annotation inputs may be associated with portions of the document based at least in part on the shape of the paths of the annotation inputs, the sequence of annotation inputs, or the locations of the annotation inputs. Additionally, the paths of the annotation inputs to portions of the document may be modified in response to modifications of the portion of the document data.

20 Claims, 20 Drawing Sheets

(51) Int. Cl.
*G06F 40/106* (2020.01)
*G06F 40/171* (2020.01)

(56) References Cited

U.S. PATENT DOCUMENTS

| | | | |
|---|---|---|---|
| 6,687,876 B1* | 2/2004 | Schilit | G06F 40/169 715/231 |
| 7,103,848 B2 | 9/2006 | Barsness et al. | |
| 8,181,103 B2* | 5/2012 | Lin | G06F 17/242 715/230 |
| 8,265,382 B2 | 9/2012 | Edgecomb et al. | |
| 8,941,600 B2 | 1/2015 | Edwards | |
| 2003/0070139 A1 | 4/2003 | Marshall et al. | |
| 2004/0205542 A1* | 10/2004 | Bargeron | G06F 40/169 715/201 |
| 2008/0195931 A1 | 8/2008 | Raghupathy et al. | |
| 2011/0035662 A1 | 2/2011 | King et al. | |
| 2011/0265034 A1 | 10/2011 | Garin et al. | |
| 2016/0253556 A1* | 9/2016 | Zhang | G06K 9/00 382/189 |
| 2017/0011262 A1* | 1/2017 | Onis | G06K 9/00422 |
| 2018/0107371 A1* | 4/2018 | Spas | G06K 9/00416 |
| 2018/0302232 A1* | 10/2018 | Rodrigues | G06F 40/169 |

OTHER PUBLICATIONS

Groller et al., Stroke pattern analysis and synthesis, Eurographics 2006 (available at https://artis.inrialpes.fr/Publications/2006/BBTSM06/pattern.pdf) (Year: 2006).*

Bargeron et al.; "reploywing Digital Ink Annotations", Conference on Human Factors in computing Systems—CHI 2003 Conference Proceedings, vol. 5, No. 1, Apr. 5, 2003; pp. 386-392.

International Search Report and Written Opinion for PCT Application No. PCT/US2018/064758 dated Mar. 26, 2019; 16 pgs.

* cited by examiner

INTERDUM, MLESTIE ARCU UT, VEHICULA EROS. DONEC PRETIUM PORTA —76 —290 DIGNISSIM CURABITUR PLACERAT FELIS TORTOR, SIT AMET ULTRICIES ANTE PORTTITOR UT. PROIN DAPIBUS EST ACSEM AUCTOR FAUCIBUS. INTEGERELEMENTUM DICTUM TELLUS.

INTERDUM, MOLESTIE ARCU UT, VEHICULA AND THE EROS. DONEC PRETIUM —76 —290' PORTA DIGNISSIM. CURABITUR PLACERAT FELIS TORTOR, SIT AMET ULTRICIES ANTE PORTTITOR UT. PROIN DAPIBUS EST AC SEM AUCTOR FAUCIBUS. INTEGER ELEMENTUM DICTUM TELLUS.

FIG. 16

MOLESTIE ARCU UT, VEHICULA AND THE EROS. DONEC PRETIUM PORTA —76 300 DIGNISSIM. CURABITUR PLACERAT FELIS TORTOR, SIT AMET ULTRICIES ANTE PORTTITOR UT. PROIN DAPIBUS EST AC SEM AUCTOR FAUCIBUS. INTEGER ELEMENTUM DICTUM TELLUS.

INTERDUM, MOLESTIE ARCU UT, VEHICULA AND THE EROS. DONEC PRETIUM —76 —76 300'— AND THE PORTA DIGNISSIM. CURABITUR PLACERAT FELIS TORTOR, SIT AMET 300'— ULTRICIES ANTE PORTTITOR UT. PROIN DAPIBUS EST AC SEM AUCTOR FAUCIBUS. INTEGER ELEMENTUM DICTUM TELLUS.

FIG. 17

AUGUE. QUISQUE ELEMENTUM, LIBERO 320
VEL SCELERISQUE VIVERRA, IPSUM 78—(MASSA) →MARGIN COMMENT
                                    —32        —324
SUSCIPIT EST, ID RUTRUM EROS MI PLACERAT

DIAM. UT VENENATIS ODIO SEMPER DAPIBUS

ACCUMSAN. MAECENAS MAURIS SEM, RHON CUS

ULLAMCORPER LEO EGET.

AUGUE. QUISQUE ELEMENTUM, LIBERO 320'
                                        →MARGIN COMMENT
VEL SCELERISQUE VIVERRA, IPSUM THE      —324
78—(MASSA) SUSCIPIT EST, ID RUTRUM EROS MI
    —322
PLACERAT DIAM. UT VENENATIS ODIO SEMPER

DAPIBUS ACCUMSAN. MAECENAS MAURIS SEM,

RHON CUS ULLAMCORPER LEO EGET.

FIG. 19

FERMENTUM MAGNA VITAE SODALES CONSECTETUR. SED VOLUTPAT ELIT QUIS LEO
AUCTOR EGET EUSMOD LEO FINIBUS. VIVAMUS
FRINGILLA FERMENTUM RHONCUS. PELLENTESQUE
DIGNISSIM ALIQUAM AUGUE VITAE ALIQUAM.
VIVAMUS MAURIS ARCU. SOLLICITUDIN SIT AMET ⸺ 340

INTEGER VULPUTATE UT TELLUS
CONVALLIS ULTRICIES.
VESTIBULUM A RISUS TELLUS.
PRAESENT UT POSUERE NISI.
CURABITUR SED METUS
ULTRICES LECTUS (CONVALLIS) ⸺ 336
⸺ 332

HERE IS A MARK ⸺ 78
330

NIBH VITAE.
HENDRERIT
LAOREET LIGULA.

ETIAM TORTOR ANTE.

IMPERDIET ET JUSTO IN, MOLLIS MATTIS
ARCU. UT VITAE TINCIDUNT QUAM. DONEC TURPIS
ODIO, POSUERE VITAE AUCTOR AC, SOLLICITUDIN
VITAE MAGNA, PRAESENT LOREM NIBH. VARIUS
QUIS LECTUS AT, TRISTIQUE ALIQUAM FELIS.

FAUCIBUS. NULLAM DICTUM
ID VELIT NON VENENATIS.
VESTIBULUM ANTE IPSUM
PRIMIS IN FAUCIBUS ORCI
LUCTUS ET ULTRICES POSUERE
CUBILIA CURAE; ETIAM UT
ORNARE ENIM.
⸺ 338

FIG. 20A

FERMENTUM MAGNA VITAE SODALES CONSECTETUR. SED VOLUTPAT ELIT QUIS LEO AUCTOR.

330 —

INTEGER VULPUTATE UT TELLUS CONVALLIS ULTRICIES.
HERE IS A MARK → VESTIBULUM A RISUS TELLUS. PRAESENT UT POSUERE NISI.
78 — CURABITUR SED METUS
332 — DOME ULTRICES LECTUS

VIVAMUS MAURIS ARVU.

SOLLICITUNDIN SIT AMET NIBH VITAE. HENDRERIT LAOREET LIGULA. ETIAM TORTOR ANTE.

IMPERDIET ET JUSTO IN, MOLLIS MATTIS ARCU. UT VITATE TINCIDUNT QUAM. DONEC TURPIS ODIO, POSUERE VITAE AUCTOR AC, SOLLICITUDIN VITAE MAGNA, PRAESENT LOREM NIBH. VARIUS QUIS LECTUS AT, TRISTIQUE ALIQUAM FELIS.

— 340

EGET EUSMOD LEO FINIBUS.
VIVAMUS FRINGILLA FERNENTUM RHONCUS. PELLENTESQUE DIGNISSM ALIQUAM AUGUE VITAE ALIQUAM.

336 — (CONVALLIS) FAUCIBUS. NULLAM DICTUM ID VELIT NON VENENATIS. VESTIBULUM ANTE IPSUM PRIMIS IN FAUCIBUS ORCI LUCTUS ET ULTRICES POSUERE CUBILIA CURAE; ETIAM UT OMARE ENIM.

FERMENTUM MAGNA VITAE SODALES CONSECTETUR. SED VOLUTPAT ELIT QUIS LEO EUSMOD LEO FINIBUS. VIVAMUS AUCTOR. EGET FRINGILLA PELLENTESQUE IS HISTORY MARY ALIQUAM A SOLLICITUDIN SIT AMET NIBH VITAE. HENDRERIT LAOREET LIGULA. ETIAM TORTOR ANTE.

INTEGER VULPUTATE UT TELLUS CONVALLIS ULTRICIES. VESTIBULUM A RISUS TELLUS. PRAESENT UT POSUERE NISI. CURABITUR SED METUS ULTRICES LECTUS (CONVALLIS) — 336

FERMENTUM RHONCUS. DIGNISSIM ALIQUAM AUGUE VITAE VIVAMUS MAURIS ARCU.

FAUCIBUS. NULLAM DICTUM ID VELIT NON VENENATIS. VESTIBULUM ANTE IPSUM PRIMIS IN FAUCIBUS ORCI LUCTUS ET ULTRICES POSUERE CUBILIA CURAE; ETIAM UT ORNARE ENIM. — 338

IMPERDIET ET JUSTO IN, MOLLIS MATTIS ARCU. UT VITATE TINCIDUNT QUAM. DONEC TURPIS ODIO, POSUERE VITAE AUCTOR AC, SOLLICITUDIN VITAE MAGNA, PRAESENT LOREM NIBH. VARIUS QUIS LECTUS AT, TRISTIQUE ALIQUAM FELIS.

FERMENTUM MAGNA VITAE SODALES CONSECTETUR. SED VOLUTPAT ELIT QUIS LEO AUCTOR. EGET EUSMOD LEO FINIBUS. VIVAMUS FRINGILLA FERMENTUM RHONCUS. PELLENTESQUE DIGNISSIM ALIQUAM AUGUE VITAE ALIQUAM. VIVAMUS MAURIS ARCU.
SOLLICITUDIN
SIT AMET NIBH
VITAE. 332

HERE IS A MARK 78

330

INTEGER VULPUTATE UT TELLUS CONVALLIS ULTRICIES. VESTIBULUM A RISUS TELLUS. PRAESENT UT POSUERE NISI. CURABITUR SED METUS ULTRICES LECTUS (CONVALLIS) ─ 336

340

FAUCIBUS. NULLAM DICTUM ID VELIT NON VENENATIS. VESTIBULUM ANTE IPSUM PRIMIS IN FAUCIBUS ORCI LUCTUS ET ULTRICES POSUERE CUBILIA CURAE; ETIAM UT ORNARE ENIM.  ─ 338

HENDRERIT LAOREET LIGULA. ETIAM TORTOR ANTE.

IMPERDIET ET JUSTO IN, MOLLIS MATTIS ARCU. UT VITATE TINCIDUNT QUAM. DONEC TURPIS ODIO, POSUERE VITAE AUCTOR AC, SOLLICITUDIN VITAE MAGNA, PRAESENT LOREM NIBH. VARIUS QUIS LECTUS AT, TRISTIQUE ALIQUAM FELIS.

FIG. 20D

MANUAL ANNOTATIONS USING CLUSTERING, ANCHORING, AND TRANSFORMATION

CROSS-REFERENCE TO RELATED APPLICATION

This application claims priority to U.S. Provisional Patent Application No. 62/648,301, filed Mar. 26, 2018, entitled "Manual Annotations Using Clustering, Anchoring, and Transformation," the contents of which is incorporated by reference in its entirety for all purposes.

BACKGROUND

The present disclosure relates generally to manual annotations of electronic documents, such as annotations generated from a stylus and displayed on an electronic display showing an image of the electronic document.

Electronic documents may be created using applications, such as word processing applications, spreadsheet applications, presentation applications, graphics applications, and notetaking applications, among others. Data for the electronic documents may be inputted via input devices, such as a keyboard and mouse, and via network resources. One may print a physical copy of the electronic document for offline review by the creator or another. The physical copy of the electronic document may be annotated during review. Unfortunately, the annotations on the physical copy are static and do not reflect subsequent changes to the electronic document. Touch screens may enable the application of manual annotations to the electronic document. Oftentimes, the electronic document may be modified in consideration of the prior annotations. As such, it may be beneficial to modify the prior annotations to the electronic document to improve coherency of the prior annotations in light of subsequent modifications to the electronic document.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to systems and methods for associating manual annotations generated via annotation inputs with document data of an electronic document for storage of the document data with the manual annotations generated via the stylus inputs. The systems and methods described herein may enable the manual annotations to be automatically modified to improve coherency in light of subsequent modifications to the document data. For example, a user may provide an annotation input to manually annotate an electronic document shown as an image on the display of an electronic device. Annotation inputs may be provided by a user in various manners, including but not limited to, a stylus (e.g., Apple Pencil®), one or more fingers of the user, a mouse, trackball, or a trackpad. As discussed in detail below, properties of the annotation inputs for the manual annotations may be used to cluster multiple separate annotation inputs together, thereby enabling the cluster of annotation inputs to be treated as one manual annotation or comment rather than a plurality of separate manual annotations. Annotation inputs may be clustered together based at least in part on the location of the annotation inputs relative to one another and the timing between annotation inputs. The properties (e.g., path shape, location) of the annotation inputs may be utilized to anchor one or more annotation inputs to an anchor location relative to one or more objects of the electronic document. The properties of the annotation inputs may also be utilized to associate one or more annotation inputs with an anchor range of text. For example, a shape (e.g., underline, strikethrough, enclosure, bracket) of a path of the one or more annotation inputs may identify the anchor range of text. Additionally, or in the alternative, an order of a plurality of annotation inputs may identify an anchor location and/or an anchor range of text. In some embodiments, one annotation input of multiple annotation inputs grouped into a cluster may be an identifying annotation input that identifies an anchor location and/or an anchor range based at least in part on a path shape (e.g., underline, strikethrough, enclosure, bracket) of the identifying annotation input. Moreover, a location of one or more annotation inputs relative to one or more objects or a margin of the electronic document may determine the anchor location for the respective one or more annotation inputs.

The annotation inputs that are associated with an anchor location within an image of the electronic document may be modified to reflect subsequent modifications to the electronic document. For example, moving text at an anchor location associated with a callout annotation may move the callout annotation. Furthermore, the annotation inputs that are associated with an anchor range may be modified to reflect subsequent expansions, contractions, or removal of the one or more objects of the electronic document within the anchor range. For example, adding text to a phrase within an anchor range that is associated with an enclosure annotation may expand the enclosure annotation to enclose the original text and the added text. Furthermore, subsequent deletion of characters associated with a strikethrough annotation may delete the strikethrough annotation as well. Accordingly, the annotation inputs to the electronic document may be dynamic, thereby enabling the annotation inputs to maintain coherency with the electronic document despite subsequent modification of the electronic document.

BRIEF DESCRIPTION OF THE DRAWINGS

Various aspects of this disclosure may be better understood upon reading the following detailed description and upon reference to the drawings in which:

FIG. 16 illustrates an example of an underline annotation that is expanded, in accordance with one or more embodiments of the present disclosure;

FIG. 17 illustrates an example of an underline annotation that is transformed, in accordance with one or more embodiments of the present disclosure;

FIG. 19 illustrates an example of a callout annotation that is transformed, in accordance with one or more embodiments of the present disclosure;

FIGS. 20A-20D illustrate examples of movement of annotations associated with an object of a document, in accordance with one or more embodiments of the present disclosure.

DETAILED DESCRIPTION OF SPECIFIC EMBODIMENTS

Figure 1:
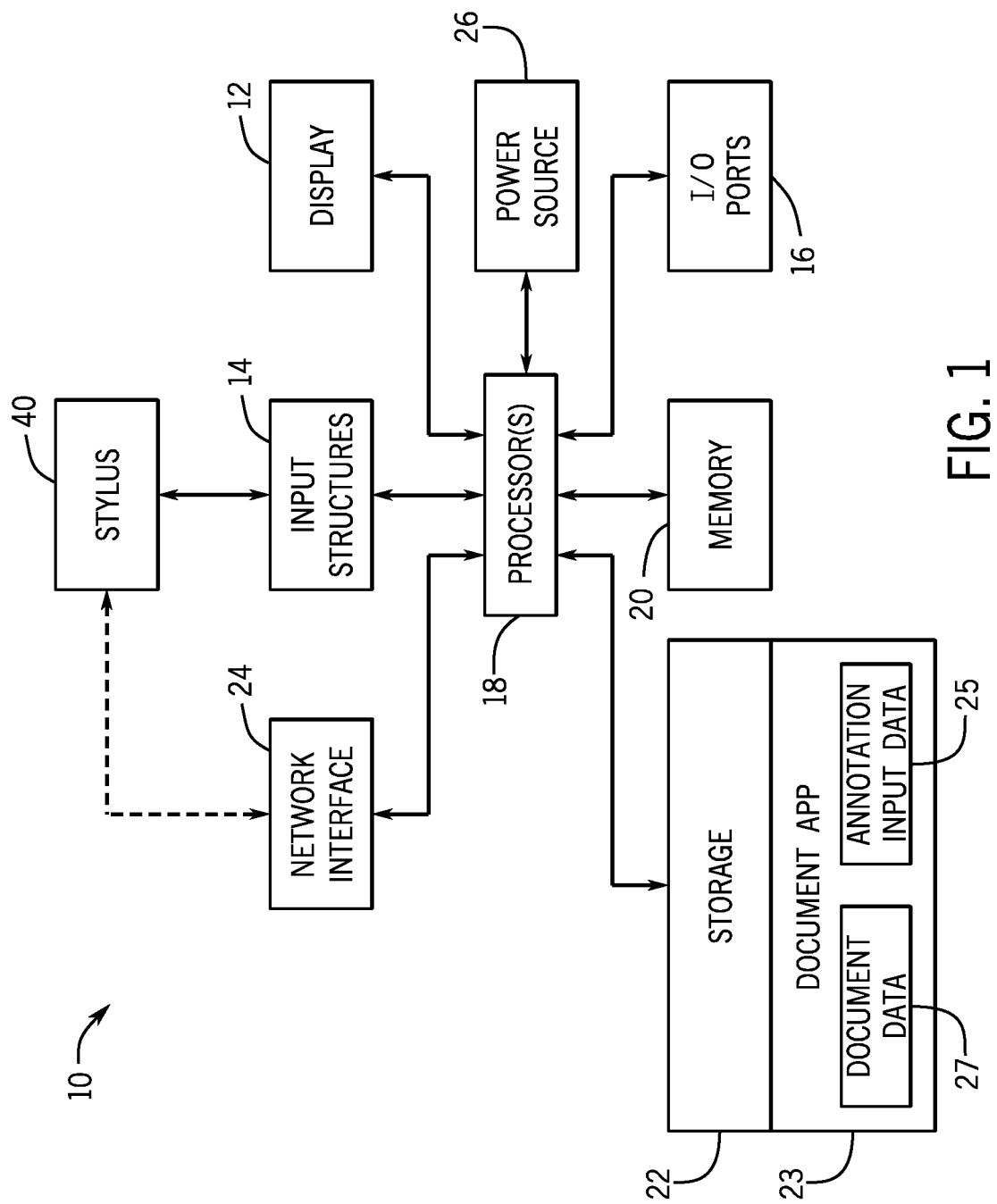
FIG. 1 is a block diagram of an electronic device that may use the techniques disclosed herein, in accordance with one or more embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The present disclosure is generally directed to enhancing annotation inputs to a document to facilitate dynamic annotations to the document that may coherently reflect subsequent modifications to the document. A user may utilize a stylus to provide annotation inputs to a document (e.g., word processing document, spreadsheet document, visual document, notetaking document), where the annotation inputs reflect manual annotations to the document or portions thereof. Each manual annotation (e.g., comment, revision) may include one or more annotation inputs, and each manual annotation may refer to an anchor location and/or anchor object within the document. Accurate determination of the anchor location and/or anchor object for each manual annotation may enable the displayed manual annotation to be moved and/or sized with the anchor location or anchor object when there are subsequent modifications to the document. For example, the anchor location or anchor object for each manual annotation may be determined based on the location of annotation inputs, the shape of the path of annotation inputs of the manual annotation, or any combination thereof. Some annotation inputs may be grouped together as a cluster to reflect a manual annotation. For example, annotation inputs may be clustered together based on a functional relationship between the relative timing of the annotation inputs and the distance between the annotation inputs to the document. Some manual annotations may be transformed to accurately reflect subsequent modifications to the document, such as the addition or removal of text with a manual annotation.

Figure 2:
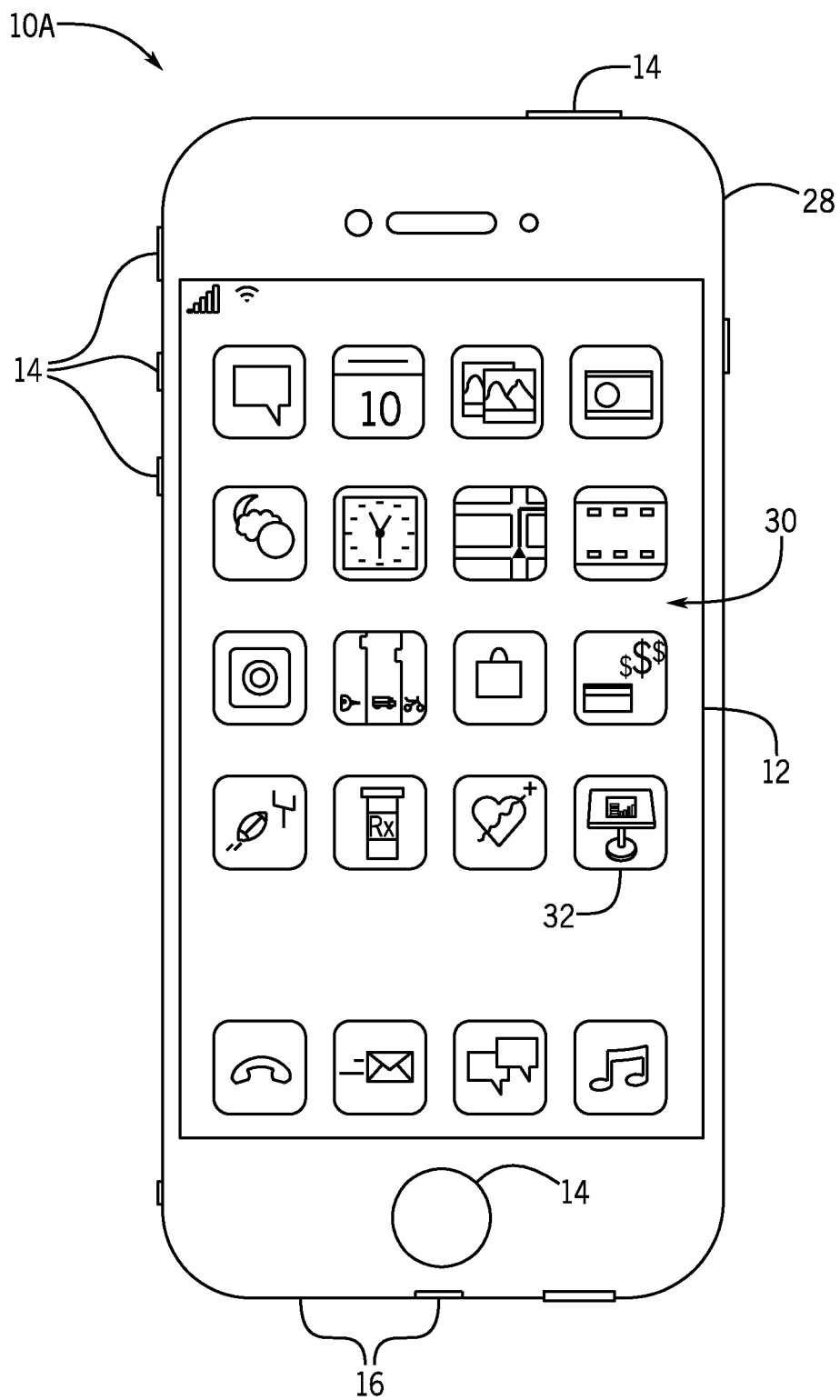
FIG. 2 is a front view of a handheld device, such as an iPhone® by Apple Inc., representing an example of the electronic device of FIG. 1.
Figure 3:
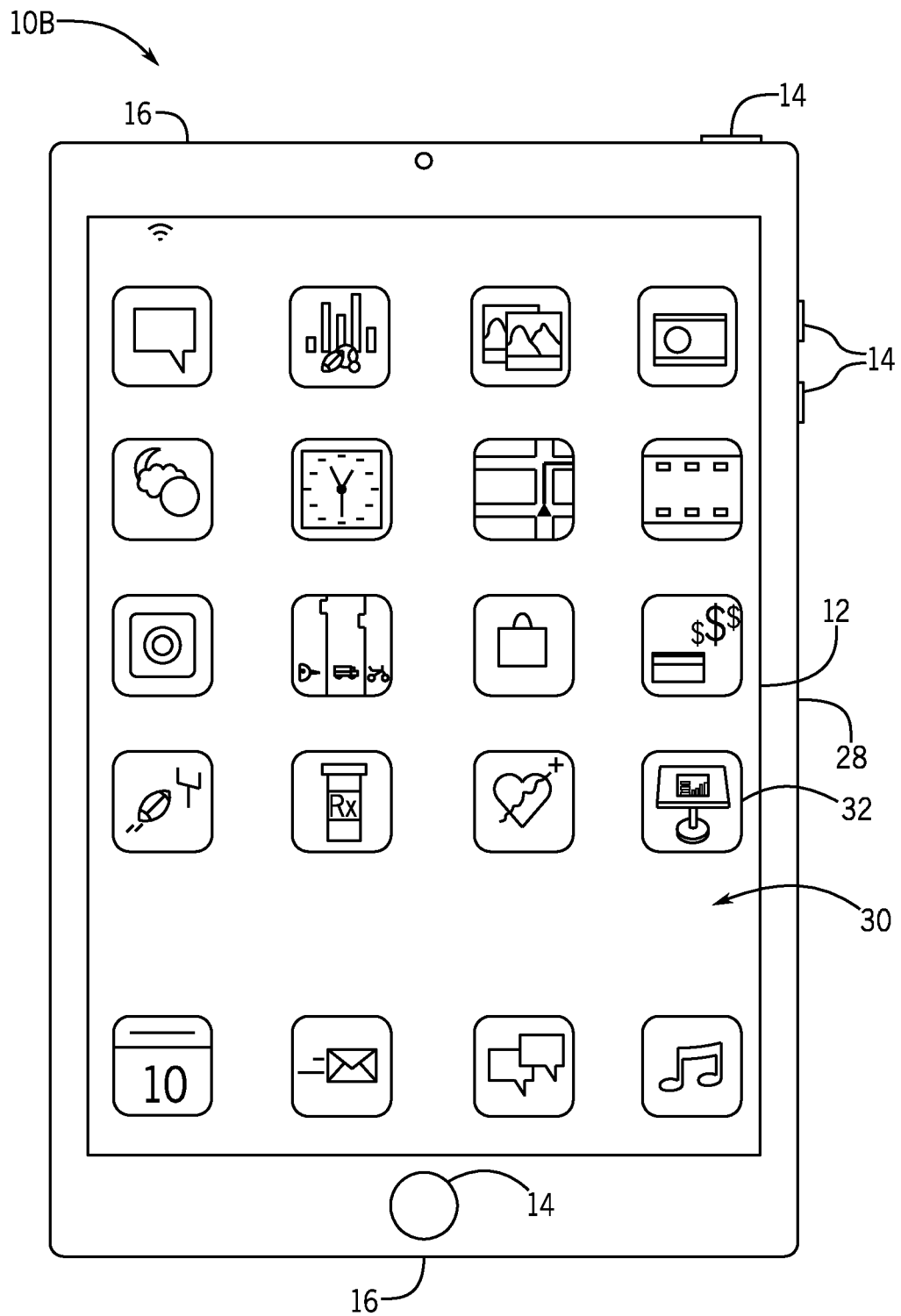
FIG. 3 is a front view of a tablet device, such as an iPad® by Apple Inc., representing an example of the electronic device of FIG. 1.
Figure 4:
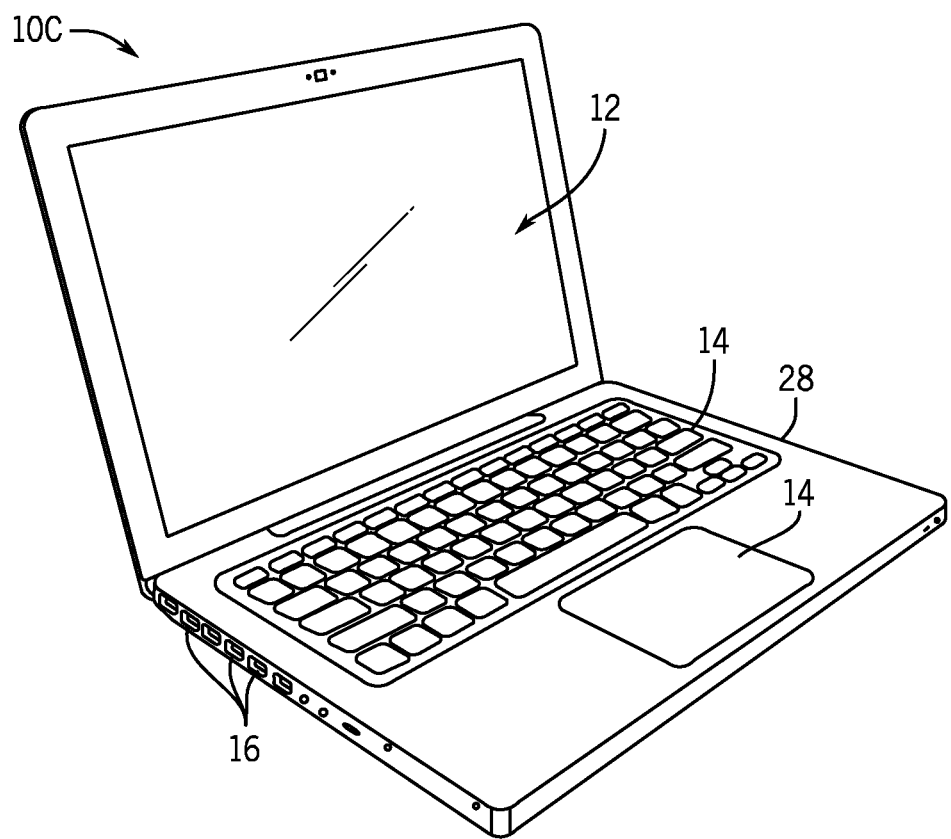
FIG. 4 is a perspective view of a notebook computer, such as a MacBook Pro® by Apple Inc., representing an example of the electronic device of FIG. 1.

A variety of suitable electronic devices may employ the techniques described herein when processing annotation inputs to a document displayed on the electronic device. FIG. 1, for example, is a block diagram depicting various components that may be present in a suitable electronic device 10 that may be used in the implementation of the present approaches. FIGS. 2, 3, and 4 illustrate example embodiments of the electronic device 10, depicting a handheld electronic device, a tablet computing device, and a notebook computer, respectively.

Turning first to FIG. 1, the electronic device 10 may include, among other things, a display 12, input structures 14, input/output (I/O) ports 16, one or more processor(s) 18, memory 20, nonvolatile storage 22 that may store a document application 23 that utilizes annotation input data 25 and data document data 27, a network interface 24, and a power source 26. The various functional blocks shown in FIG. 1 may include hardware elements (including circuitry), software elements (including computer code stored on a non-transitory computer-readable medium) or a combination of both hardware and software elements. The annotation input 25 may be generated via input from a stylus 40 to the electronic device 10. As discussed below, in some embodiments, the annotation input 25 may be generated via input from a finger of a user of the electronic device 10, a mouse, or another input structure 14. In some embodiments, the annotation input data 25 may be received by the electronic device 10 directly from the stylus 40. In some embodiments, the annotation input data 25 may be stored with the document data 27 and received indirectly, such as via the network interface 24 or I/O ports 16. For example, a user may utilize the stylus 40 with a first electronic device to generate the annotation input data 25 (e.g., stylus input data) that is stored with the document data 27. The same first electronic device may later process (e.g., cluster, anchor, transform) the annotation input data 25 with the document data, as described in detail below. In some embodiments, a different, second electronic device may indirectly receive the annotation input data 25 with the document data 27, then later process (e.g., cluster, anchor, transform) the annotation input data 25 with the document data 27, as described in detail below.

As will be discussed in more detail below, the processor(s) 18 may cluster and associate (e.g., anchor) annotation inputs (e.g., annotation input data 25) with text or objects of the document data 27 to generate manual annotations that are associated with the document data 27. This may be done to enable automated moving or transforming of the manual annotations based on subsequent modifications to the document data 27. For example, the processor(s) 18 may cluster and anchor annotation input data continuously, on demand, or at predetermined intervals while the stylus 40 is being utilized. The processor(s) 18 may generate manual annotations over an image of the document data based upon these clustered and/or anchored annotation input data. The processor(s) 18 may transform the manual annotations, as appropriate, based on that annotation input data at a later time, such as when a user modifies the document data 27. The techniques described herein are described in detail below.

It should be noted that FIG. 1 is merely one example of a particular implementation and is intended to illustrate the types of components that may be present in the electronic device 10. Indeed, the various depicted components (e.g., the processor(s) 18) may be separate components, components of a single contained module (e.g., a system-on-a-chip device), or may be incorporated wholly or partially within any of the other elements within the electronic device 10. The components depicted in FIG. 1 may be embodied wholly or in part as machine-readable instructions (e.g., software or firmware), hardware, or any combination thereof.

Figure 5:
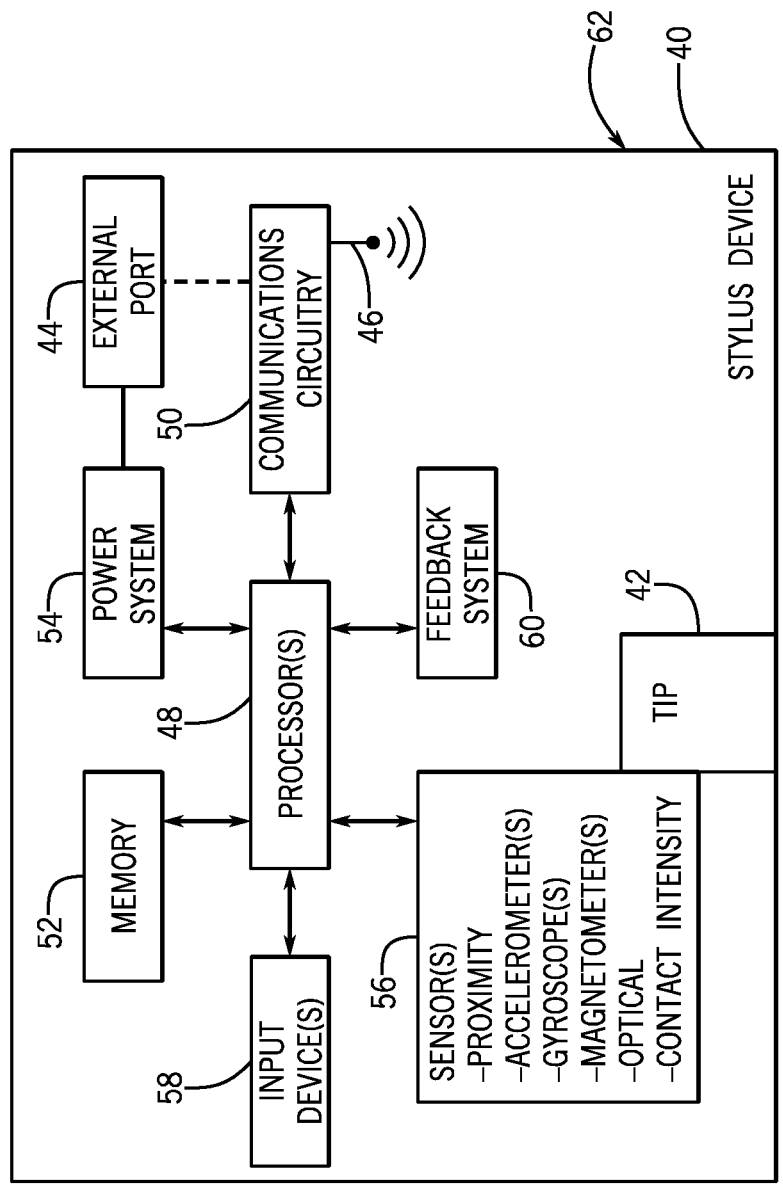
FIG. 5 illustrates a block diagram of a stylus device, in accordance with one or more embodiments of the present disclosure.

By way of example, the electronic device 10 may represent a block diagram of the handheld device depicted in FIG. 2, the tablet computing device depicted in FIG. 3, the notebook computer depicted in FIG. 4, or similar devices, such as desktop computers, televisions, and so forth. In the electronic device 10 of FIG. 1, the display 12 may be any suitable electronic display used to display image data (e.g., a liquid crystal display (LCD) or an organic light emitting diode (OLED) display). In some examples, the display 12 may represent one of the input structures 14, enabling users to interact with a user interface of the electronic device 10. In some embodiments, the electronic display 12 may be a MultiTouch™ display that can detect multiple touches at once. For example, the electronic display 12 may detect touches from one or more fingers, one or more styluses (e.g., active stylus, passive stylus), or any combination thereof. As discussed in detail below, the electronic display 12 may detect touches from a stylus device 40, as shown in FIG. 5. Other input structures 14 of the electronic device 10 may include buttons, keyboards, mice, trackpads, and the like. It may be appreciated that various embodiments of the input structures 14 may provide the annotation input data 25, as discussed below. The I/O ports 16 may enable electronic device 10 to interface with various other electronic devices.

The processor(s) 18 and/or other data processing circuitry may execute instructions and/or operate on data stored in the memory 20 and/or nonvolatile storage 22. The memory 20 and the nonvolatile storage 22 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system (e.g., OS X® or iOS by Apple Inc.) or an application program (e.g., Pages® by Apple Inc., Numbers® by Apple Inc., Keynote® by Apple Inc., Notes by Apple Inc.).

The network interface 24 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The power source 26 of the electronic device 10 may be any suitable source of energy, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 28 to protect interior components from physical damage and to shield them from electromagnetic interference. The enclosure 28 may surround the display 12, which may display a graphical user interface (GUI) 30 having an array of icons 32. By way of example, one of the icons 32 may launch a document application program (e.g., Pages® by Apple Inc.).

User input structures 14, in combination with the display 12, may allow a user to control the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Touchscreen features of the display 12 of the handheld device 10A may provide a simplified approach to controlling the document application program. The handheld device 10A may include I/O ports 16 that open through the enclosure 28. These I/O ports 16 may include, for example, an audio jack and/or a Lightning® port from Apple Inc. to connect to external devices. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a display 12, input structures 14, I/O ports 16, and a housing 28. In one embodiment, the input structures 14 (e.g., a keyboard and/or touchpad) may be used to interact with the computer 10C, such as to start, control, or operate a GUI or applications (e.g., Pages® by Apple Inc.) running on the computer 10C.

With the preceding in mind, a variety of computer program products, such as applications or operating systems, may use or implement the techniques discussed below to enhance the user experience on the electronic device 10 and to improve the performance of the device when executing an application encoded as discussed herein. Indeed, any suitable computer program product that provides for the use of annotation inputs for manual annotations over a document (e.g., word processing document, spreadsheet document, presentation document, photo document, graphics document, note document) may employ and benefit from some or all of the techniques discussed below. For instance, the electronic device 10 may store and run a document application 34 (e.g., Pages® from Apple Inc.). The document application may be stored as one or more executable routines (which may encode and implement the actions described below) in memory and/or storage (FIG. 1). These routines, when executed, may cause control codes and logic as discussed herein to be implemented and may cause images as discussed herein to be displayed on a screen of the electronic device or in communication with the electronic device.

Turning to FIG. 5, an example of a stylus device 40 is provided in accordance with aspects of the present disclosure. As discussed herein, the stylus device 40 (i.e., stylus) is a type of input structure 14 that may be utilized by the user to provide an input to a touch sensitive electronic display 12. In some embodiments, the stylus device 40 is an active stylus configured to communicate with the electronic device 10 by way of more than touching a tip 42 of the stylus to the electronic display 12. That is, an active stylus may communicate with the electronic device 10 via an external port 44 and/or an antenna 46. One or more processors 48 of the stylus device 40 is coupled with communications circuitry 50 to facilitate wired (via the external port 44) and/or wireless (via the antenna 46) communications with the electronic device 10. The stylus device 40 may communicate with the electronic device 10 via the communications circuitry 50 continuously, at predetermined intervals during activity of the stylus device 40, and/or on demand as triggered by the stylus device 40 and/or the electronic device 10. The communications circuitry 50 optionally uses any of a plurality of communications standards, protocols, and/or technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

A memory 52 coupled to the processor(s) 48 of the stylus 40 may store annotation input data (e.g., stylus input data) of the stylus 40. The processor(s) 48 may run or execute various software programs and/or sets of instructions stored in memory 52 to perform various functions for the stylus device 40 and to process data. A power system 54 of the stylus device 40 is configured to provide power for the processor(s) 48, communications circuitry 50, memory 52, and any other components of the stylus device 40. In some embodiments, the power system 54 has replaceable batteries or rechargeable batteries. Embodiments of the power system 54 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories. The stylus device 40 may be a model of an Apple Pencil® available from Apple Inc.

In some embodiments of the stylus device 40, one or more sensors 56 may provide the stylus device 40 with sensor inputs regarding the use of the stylus device 40 or the environment about the stylus device 40. The sensor inputs may include, but are not limited to, the position of the stylus device 40 with respect to other objects (e.g., electronic display 12 of the electronic device), the orientation of the stylus device 40, electromagnetic fields around the stylus device 40, or forces on the stylus device 40, or any combination thereof. In some embodiments, one or more of the sensors 56 may include one or more accelerometers, gyroscopes, or magnetometers (e.g., as part of an inertial measurement unit (IMU)) for obtaining information concerning the location and positional state of the stylus device 40. In some embodiments, the one or more sensors 56 may include one or more optical sensors (e.g., charge-coupled device (CCD), complementary metal-oxide semiconductor (CMOS) phototransistors) that may receive light from the environment. The one or more optical sensors may receive the light through one or more lenses, and convert the light to data representing an image. In some embodiments, the one or more sensors 56 may include one or more proximity sensors configured to determine the proximity of the stylus device 40 to the electronic device 10.

In some embodiments, the one or more sensors 56 may include one or more contact intensity sensors, such as piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). The one or more contact intensity sensor(s) receive contact intensity information (e.g., pressure information or a proxy for pressure information) from the environment. In some embodiments, at least one contact intensity sensor is collocated with, or proximate to, the tip 42 of stylus device 40.

In some embodiments, one or more input devices 58 of the stylus device 40 may facilitate user communication to the stylus device 40. Some embodiments of the stylus device 40 may include physical buttons (e.g., push buttons, rocker buttons, etc.), capacitive buttons, dials, slider switches, click wheels, and so forth. For example, a first input device 58 of the stylus device 40 may initiate pairing of the stylus device 40 with the electronic device 40, and a second input device 58 of the stylus device 40 may trigger the transmission of annotation inputs stored in the memory 52 of the stylus device 40 to electronic device 10.

In some embodiments, a feedback system 60 of the stylus device 40 may provide feedback to the user. For example, the feedback system 60 may include a speaker or other audio component to provide an audio feedback to the user. Some embodiments of the feedback system 60 may include one or more lights or a display. Furthermore, some embodiments of the feedback system 60 may include electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The feedback system 60 may receive tactile feedback generation instructions from the processor(s) 48 and generate tactile outputs on the stylus device 40 that are capable of being sensed by a user of the stylus device 40. In some embodiments, at least one tactile output generator of the feedback system 60 is collocated with, or proximate to, a length (e.g., a body 62 or a housing) of the stylus device 40 and, optionally, generates a tactile output by moving the stylus device 40 vertically (e.g., in a direction parallel to the length of the stylus device 40) or laterally (e.g., in a direction normal to the length of the stylus device 40).

The processor(s) 48 of the stylus device 40 may execute instructions stored in the memory 52 to detect contact with stylus device 40. The instructions executed by the processor(s) 48 may perform various operations related to detection of contact (e.g., detection of the tip of the stylus device 40 with a touch-sensitive display, such as touch screen 12 of the electronic device 10, or with another surface, such as a desk surface), determination if contact has occurred (e.g., detecting a touch-down event), determination of an intensity of the contact (e.g., the force or pressure of the contact or a substitute for the force or pressure of the contact), determination if there is movement of the contact and tracking the movement (e.g., across the electronic display 12 of the electronic device 10), and determination if the contact has ceased (e.g., detecting a lift-off event or a break in contact). Determination of a path of the tip 42 across the electronic display 12, which is represented by a series of contact data points, optionally includes determining speed (magnitude), velocity (magnitude and direction), and/or an acceleration (a change in magnitude and/or direction) of the point of contact. As noted above, in some embodiments, one or more of these operations related to detection of contact are performed by the processor(s) 48 of the stylus device.

The processor(s) 48 may execute instructions stored in the memory 52 to detect a gesture input by stylus device 40. Different gestures with stylus device 40 may have different contact patterns (e.g., different motions, timings, and/or intensities of detected contacts). Thus, a particular contact pattern may be detected as a type of gesture. For example, a single tap gesture may be determined via detecting a touch-down event followed by a lift-off event at the same position (or substantially the same position) as the touch-down event (e.g., at the position of an icon). As another example, a swipe gesture may be determined via detecting a touch-down event followed by one or more stylus-dragging events, and subsequently followed by a lift-off event at another position. The processor(s) 48 may execute instructions to detect various gestures, including gestures utilizing one or more sequential contacts by the stylus device 40 with the electronic device 10.

In some embodiments, the processor(s) 48 executes instructions stored in the memory 52, in conjunction with feedback from one or more sensors 56 (e.g., accelerometers, gyroscopes, magnetometers), to detect positional information concerning the stylus device 40, such as the stylus's attitude (roll, pitch, and/or yaw) in a particular frame of reference. The processor(s) 48 may utilize feedback from one or more sensors 56 to detect stylus movement gestures, such as flicks, taps, and rolls of the stylus device 40. The processor(s) 48 may execute instructions for performing various operations related to detecting the position of the stylus device 40 and detecting changes to the position of the stylus device 40 in a particular frame of reference. In some embodiments, the processor(s) 48 may execute instructions for detecting the positional state of the stylus device 40 relative to the electronic device 10 and for detecting changes to the positional state of the stylus device 40 relative to the electronic device 10.

Figure 6:
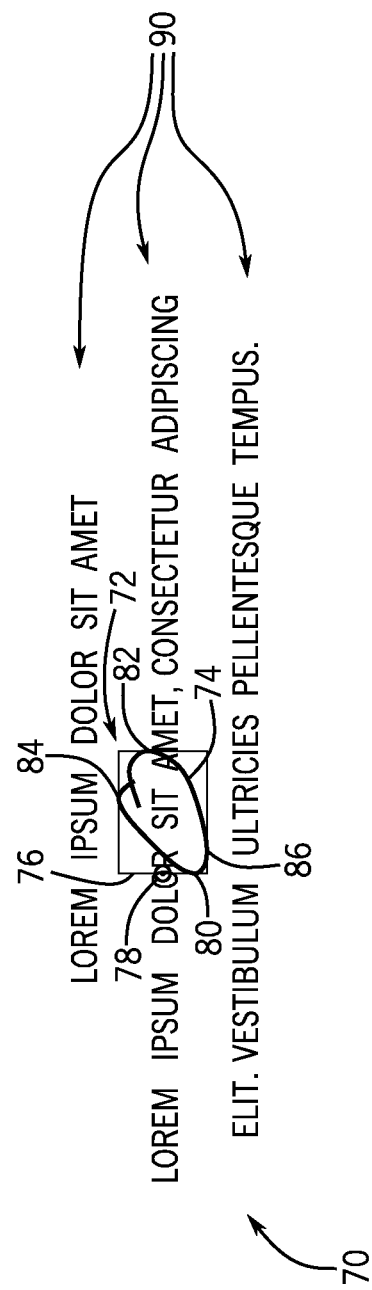
FIG. 6 illustrates an example of a manual annotation over an image of a document, in accordance with one or more embodiments of the present disclosure.

Turning to FIG. 6, an example of an image 70 representing document data is shown with a manual annotation 72 over the image 70. The manual annotation 72 is a graphical representation of a path 74 of the annotation input over the image 70. As discussed above, the stylus device 40 may record the path 74 of the annotation input data when the stylus device 40 interfaces with the electronic display 12 of the electronic device 10. In some embodiments, the electronic device 10 detects and records the path 74 as annotation input data when a user-controlled object (e.g., stylus device 40, user's finger) interfaces with the electronic display 12 of the electronic device 10. In some embodiments, the annotation input data may be generated via user control of a mouse, a trackball, a trackpad, or other input structure that facilitates a manual annotation with a graphical representation of a path 74 as described herein. Indeed, while the methods and systems related to the stylus inputs described below are described in conjunction with the stylus device 40, the methods and systems are intended to cover at least the annotation inputs provided by a user via manual control of an input structure.

The processor(s) 48 of the stylus device 40 and/or the processor(s) 18 of the electronic device 10 may execute instructions to process the path 74 of the annotation input to determine an anchor range 76 and an anchor location 78 for the manual annotation 72. The anchor range 76 may be based at least in part on a left-most extent 80 and right-most extent 82 of the path 74 over the image 70. The anchor range 76 may be defined as a quantity of pixels of the electronic display 12, a quantity of characters of the document data, a length in inches or millimeters defined relative to a physical representation (e.g., printout) of the document data, or any combination thereof. In some embodiments, the anchor range 76 includes a vertical component and is based at least in part on the upper-most extent 84 and bottom-most extent 86 of the path 74 over the image 70. The anchor range 76 may be associated with one or more lines 90 of the document image 70, based on the vertical extents 84, 86 of the anchor range 76 and the spacing of the lines 90. In some embodiments, the anchor location 78 for the annotation 72 may be at a vertical midpoint between the vertical extents 84, 86 of the anchor range 76, and on the left-most extent 80 of the anchor range 76. The annotation 72 may be displayed at an associated location relative to the anchor location 78.

It may be appreciated that the document data shown in the image 70 is on a first layer (e.g., document layer), and the manual annotation 72 is on a second layer (e.g., annotation layer). As discussed in detail below, the anchor range 76 may correspond to portions or objects of the document data shown in the image 70 under the manual annotation 72. For example, the manual annotation 72 of FIG. 6 illustrates an enclosure shape (e.g., circle) around the text "R SIT A" shown in the image 70. In some embodiments, the anchor range 76 may associate the manual annotation 72 to the text "SIT" of the underlying document data represented by the image 70. As discussed in detail below, the anchor location 78 defines a location within the document data and/or an object within the document data that is to be associated with the manual annotation 72. That is, the annotation data for the manual annotation 72 on the annotation layer may include the anchor location 78 on the document layer, thereby enabling the path 74 of the annotation layer to be anchored on the document layer and shown over the image 70 at the appropriate associated location relative to the anchor location 78. For example, the anchor location 78 for the manual annotation 72 shown in FIG. 6 may be associated with the text "SIT" or the second "O" of the text "DOLOR" that precedes the text "SIT." As discussed in detail below, the electronic device 10 may execute instructions to modify (e.g., move, transform) a manual annotation when the text or object associated with the manual annotation is modified.

Figure 7:
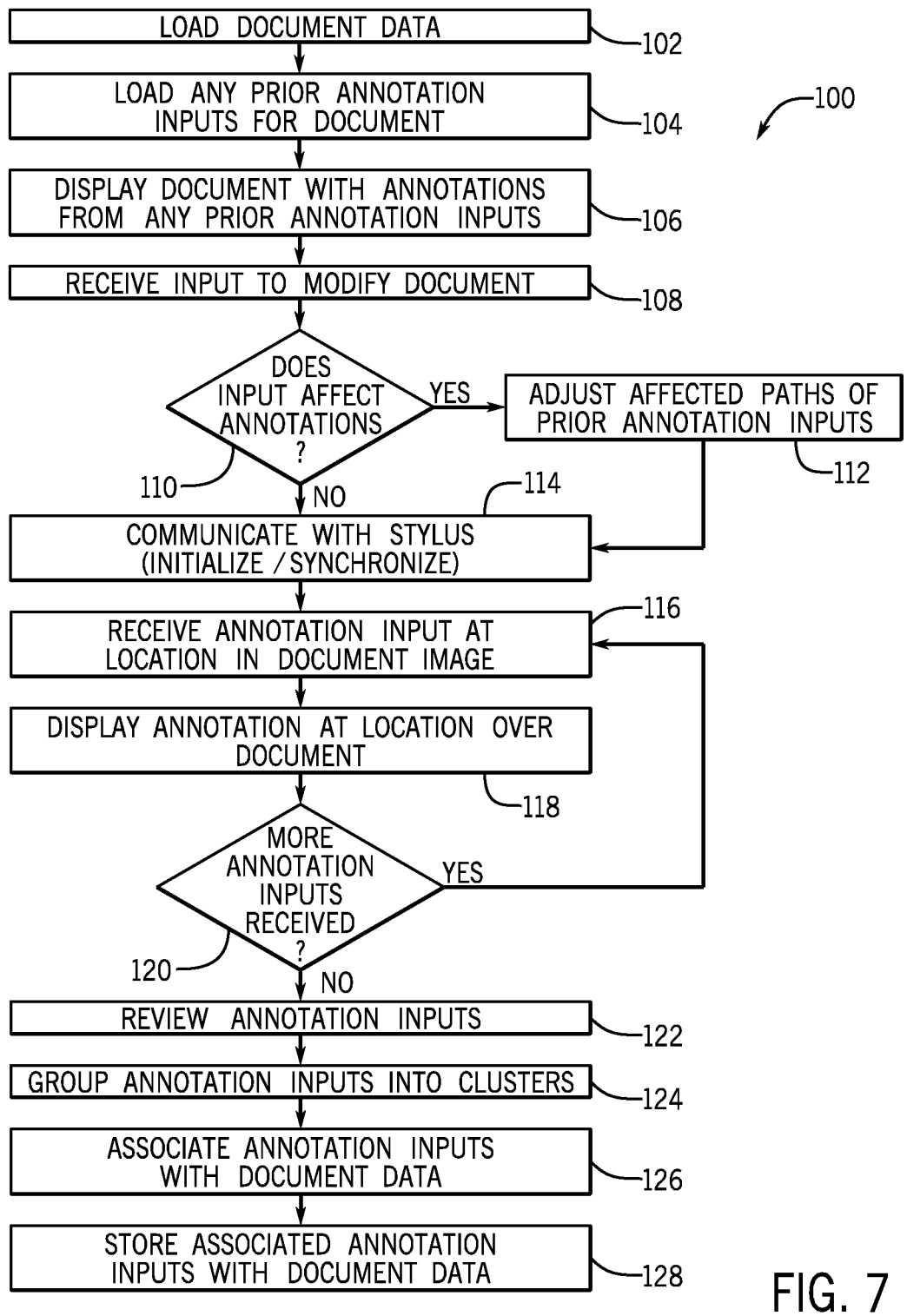
FIG. 7 depicts a process flow diagram depicting control logic of a process for processing annotation inputs with document data for an electronic document, in accordance with one or more embodiments of the present disclosure.

With the preceding in mind, and to facilitate explanation, FIG. 7 illustrates a process flow diagram 100 for processing annotation inputs, in accordance with aspects of the present disclosure. In some embodiments, one or more processors 18 of the electronic device 10 executes instructions from memory 20 to carry out the steps shown in the process flow diagram 100. Although the process 100 illustrates the steps in an order, it may be appreciated that the steps may be executed in a different order, or some steps may be omitted during execution of the process 100. For example, a document without any prior annotations may receive annotation inputs, such that blocks 104-112 are skipped. The process 100 may include loading document data (block 102) in a document application. The document data may be a word processing document, a spreadsheet document, a presentation document, a note document, a graphics or drawing document, or any combination thereof. Moreover, the document data may have been initially generated by the current user of the electronic device 10, or by another user. The process may also include loading any prior annotation inputs (block 104) for the document data in the document application. The prior annotation inputs may have been generated by the current user of the electronic device 10, or by another user. Upon loading the document data and prior annotation inputs, the process 100 may include the display of an image representing the document data with manual annotations representing any prior annotation inputs (block 106).

The electronic device may receive inputs to modify the document represented by the document data (block 108). The inputs to modify the document may be received by one or more of the input structures 14 (e.g., button, keyboard, mouse, trackpad, touch screen), the network interface of the electronic device 24, or any combination thereof. For example, the inputs may add text or objects (e.g., images, cells, charts, etc.) to the document, remove text or objects from the document, rearrange text or objects within the document, or any combination thereof. The process 100 then determines if the inputs affect any of the annotations from prior annotation inputs (decision block 110). For example, adding text or objects to pages of the document after pages with prior annotations may be less likely to affect any prior annotations as compared to adding text or objects to pages of the document preceding pages with prior annotations or pages with prior annotations, as these modifications may move the anchor location within the document, thereby affecting the prior annotations. As discussed in detail below, the paths of the prior annotations that are affected by the received modifications to the document may be adjusted (block 112). For example, enclosure annotations may be moved, expanded, or contracted based on the received modifications. Additionally, or in the alternative, annotations with arrows or callouts may be rearranged, expanded, or contracted based on the received modifications.

After adjustment of any prior annotations, if necessary, the process 100 includes communication between the electronic device and the stylus device (block 114). In some embodiments, the electronic device 10 may initialize or synchronize communications with the stylus device 40. For example, the stylus device 40 may be paired with the electronic device 10 to facilitate exclusion of other inputs to the electronic device 10 via the electronic display 12. That is, pairing the stylus device 40 to the electronic device 10 may enable the electronic device 10 to receive and process inputs from the paired stylus device while rejecting other manual inputs by the user or stylus inputs from unpaired stylus devices. Initialization or synchronization of the stylus device 40 may enable the electronic device 10 to reject inputs by the user's palm or hand while utilizing the paired stylus device 40 to provide stylus inputs. Additionally, the stylus device 40 may be synchronized with the electronic device 10 so that stylus inputs recorded by the stylus device 40 may be accurately compared or exchanged with annotation inputs recorded by the electronic device 10. That is, synchronization may enable the electronic device 10 and the stylus device 10 to record the same times for touch-down, lift-off, and contact data points (e.g., path) of a respective annotation input.

Figure 21:
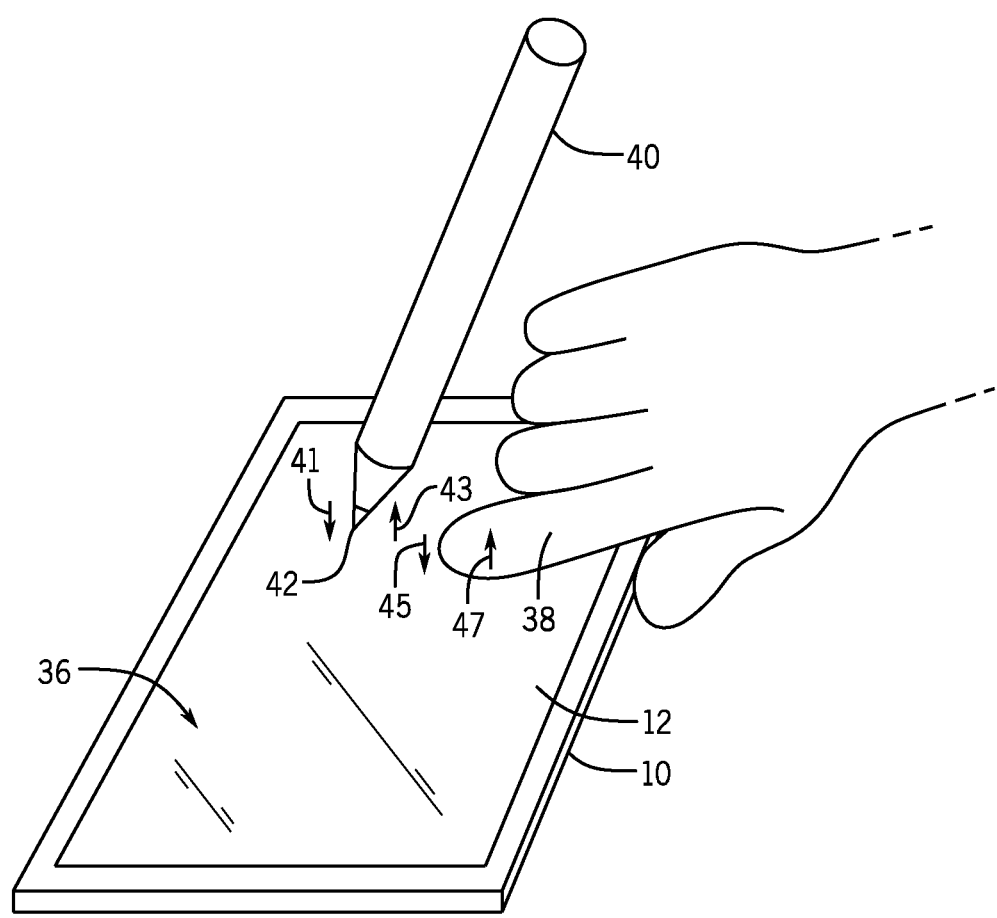
FIG. 21 illustrates examples of input structures that may be used with the electronic device for annotation inputs, in accordance with one or more embodiments of the present disclosure.

In some embodiments, the electronic device 10 receives an annotation input (e.g., stylus input) at locations in the image of the document (block 116). As discussed herein, the annotation input may be generated by user interaction with a surface of an electronic device (e.g., electronic display, trackpad). FIG. 21 illustrates examples of a stylus device 40 and a user finger 38 that interface with a surface 36 of an electronic display 12. With respect to the stylus device 40, when the tip 42 of the stylus device 40 is moved towards the surface 36, as shown by arrow 41, such that the tip 42 contacts the surface 36, a touch-down event for an annotation input occurs at the initial time of contact. When the tip 42 of the stylus device 40 is moved away from the surface 36, as shown by arrow 43, a lift-off event for an annotation input occurs when the tip 42 ceases to contact the surface 36. Likewise with respect to the user finger 38, when the finger 38 is moved towards the surface 36, as shown by arrow 45, such that the user finger 38 contacts the surface 36, a touch-down event for an annotation input occurs at the time of contact. When the user finger 38 is moved away from the surface 36, as shown by arrow 47, a lift-off event occurs for an annotation input when the user finger 38 ceases to contact the surface 36. Between the touch-down event and lift-off event while the stylus device 40 interfaces with the surface 36, the stylus device 40 may move across the surface 36 to generate a path shape for the annotation input.

The annotation input may be a tap at one location and at approximately one time (e.g., within a brief threshold tap time), or a stroke that includes a touch-down location and a corresponding touch-down time, a lift-off location and a corresponding lift-off time, and contact data points therebetween the touch-down location and the lift-off location. Each annotation input that is a stroke may correspond to a path based on the touch-down location, the touch-down time, the lift-off location, the lift-off time, and contact data points therebetween. As discussed herein, this path may be graphically displayed as an annotation. It may be appreciated that each annotation may include one or more shapes (e.g., circle, ellipse, box, bracket, line, curve), characters, symbols, arrows, or any combination thereof. For example, a comment written by the user in script may include multiple characters per annotation, but a comment written in print by the user may include multiple annotations per character. In some embodiments, multiple annotation inputs may be clustered together into one annotation, as described below.

The electronic display 12 of the electronic device 10 may display the annotation for the annotation input at the location over the document where the annotation input is received (block 118). If more annotation inputs are to be received (decision block 120), then blocks 116 and 118 to receive annotation inputs and display annotations based on the received annotation input are repeated. While some embodiments of the process 100 may proceed from block 118 directly to reviewing annotation inputs (block 122), the blocks 116 and 118 to receive annotation inputs and display annotations may be repeated. It may be beneficial to repeat blocks 116 and 118 during an interval while the stylus device 40 remains paired with the electronic device 10, for a time period (e.g., 1, 5, 10, 30 minutes) after the last annotation input is received or the stylus device was last moved, or while a manual annotation mode for the document application remains active. In some embodiments, the process 100 may proceed to block 122 to review annotation inputs in response to a user input to the stylus device 40, a user input to the electronic device 10, or after a predetermined delay period. Delay of the process 100 to proceed to block 122 may enable multiple annotation inputs to be reviewed, grouped, and associated together, thereby reducing the processing effort of the electronic device 10.

The process 100 may review annotation inputs received (block 122) continuously, on demand, or at predetermined intervals while the stylus device 40 is being actively utilized. The review of the annotation inputs received (block 122) may include receiving stylus inputs from the stylus device 40 that were stored in the memory 52 of the stylus device 40. In some embodiments, the stylus inputs received from the stylus device 40 are compared with the annotation inputs recorded by the electronic device 10 and displayed on the electronic display 12. In some embodiments, the electronic device 10 displays the annotations over the image of the document data, but only receives the stylus inputs (e.g., touch-down location, touch-down time, lift-off location, lift-off time, contact data points therebetween) from the stylus device 40 when the annotation inputs are reviewed at block 122. Review of annotation inputs received may be triggered by actuation of an input device on the stylus device 40, selection of a control of the document application, automatically by the document application based on user action (e.g., closing the document, generating new page or object in the document) within the document application, or any combination thereof. In some embodiments, the electronic device 10 may review the received annotation inputs at predetermined intervals, such as 1, 5, 10, or 30 minutes more of use of the stylus device 40. On demand review or review at predetermined intervals may reduce power consumption by the stylus device 40 by reducing the frequency or duration of operation for the communications circuitry 50 of the stylus device 40, thereby improving the battery life of the stylus device 40. Continuously reviewing the annotation inputs as they are received may enable the document application to cluster and anchor the annotation inputs nearer in time to when the annotation inputs are generated by the user.

The process 100 may group annotation inputs into clusters (block 124). In some embodiments, one or more annotation inputs are grouped into a cluster based on the location of the annotation inputs relative to one another. That is, annotation inputs with paths near one another (e.g., within 5, 10, 20, 50, or 100 or more pixels) may be grouped together into a cluster. In some embodiments, one or more annotation inputs are grouped into a cluster based at least in part on the location of the annotation inputs relative to one another and the timing of the annotation inputs relative to one another. As discussed in detail below, one or more annotation inputs may be grouped together into a cluster based at least in part on a function relating a location or path of the annotation inputs relative to one another and the timing of the annotation inputs relative to one another.

The process 100 may associate annotation inputs or groups of annotation inputs with document data (block 126). As discussed in detail below, each annotation input or group of annotation inputs may be associated with portions of the document data or objects of the document data based on the shapes of the paths of the annotation inputs, the sequence or timing of the annotation inputs, or the location of the annotation inputs, or any combination thereof. Associating one or more annotation inputs with document data may include determining an anchor location for the one or more respective annotation inputs, determining an anchor range for the one or more respective annotation inputs, or any combination thereof. In some embodiments, the annotation data for annotation inputs may include the paths of the annotation, the anchor location for the annotation, the associated location relative to the anchor location for the paths of the annotation, and the anchor range for the annotation. In some embodiments, the annotation data includes the associated portion of the document data (e.g., text, object) itself. The process 100 may store the associated annotation inputs with the document data in the memory 20 of the electronic device 10 (block 128). The annotation inputs received at block 116 may be stored with the prior annotation inputs loaded at block 104. Accordingly, the stored annotation data (e.g., stylus inputs) and document data may be loaded (blocks 102 and 104) together during subsequent iterations of the process 100.

The process 100 described above and illustrated in FIG. 7 may be executed by the electronic device 10 that the user utilizes to manually annotate the document image with the stylus device 40. As noted with block 122, the electronic device 10 may review the annotation inputs continuously, on demand, or a predetermined intervals. In some embodiments, a user may utilize the stylus device 40 to manually annotate the document image at a first time, and portions of the process 100 may be executed to process the annotation inputs at a second time different (i.e., later) than the first time. For example, a first user may utilize the stylus device 40 to manually annotate the document image shown on a first electronic device. The stylus inputs for those manual annotations by the first user may be stored as stylus data with the document data. A second user utilizing a second electronic device may load those manual annotations in the annotation data, and the second electronic device execute portions of the process 100 with the annotation inputs for those manual annotations. The second electronic device may group the annotation inputs for those manual annotations into one or more clusters (block 124), associate annotation inputs or groups of annotation inputs with anchor locations in the document data (block 126), adjust affected paths of prior annotation inputs based on modifications to the document data (blocks 108 and 112), or any combination thereof.

Figure 8:
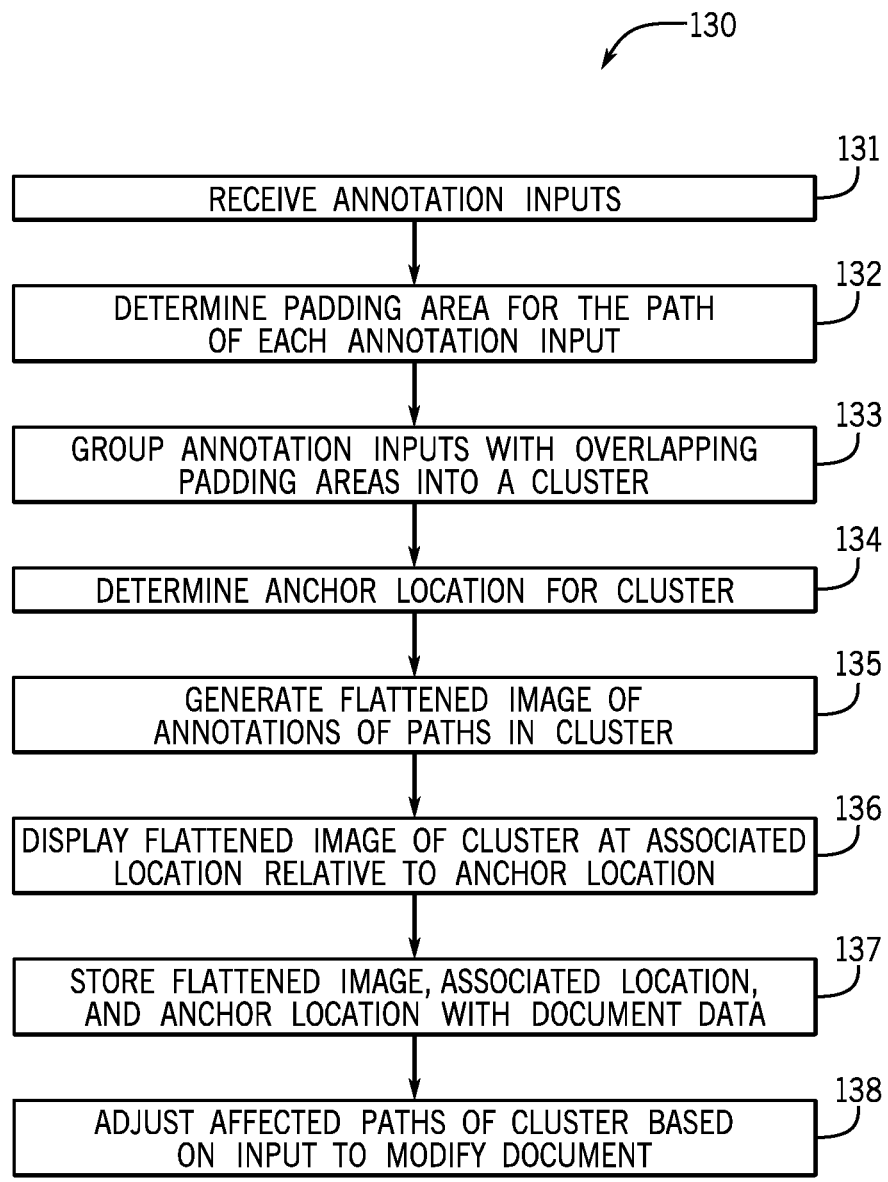
FIG. 8 depicts a process flow diagram depicting control logic for grouping one or more annotation inputs into a cluster, in accordance with one or more embodiments of the present disclosure.

FIG. 8 illustrates a process 130 for grouping one or more annotation inputs into a cluster, in accordance with aspects of the present disclosure. In some embodiments, the one or more processors 18 of the electronic device 10 may execute instructions for the process 130. The process 130 includes receiving multiple annotation inputs (block 131) from the memory of the electronic device 10 or from the stylus device 40. Each annotation input may correspond to a path based on the touch-down location of the tip of the stylus device 40 with the electronic display, the touch-down time, the lift-off location of the tip of the stylus device 40 with the electronic display, the lift-off time, and contact data points therebetween the touch-down location and the lift-off location. The process 130 then determines a padding area for the path of each annotation input (block 132). The determined padding area is an area surrounding each contact point along the path of each annotation input. As discussed in detail below, the padding area for a annotation input may decrease over time since the lift-off time of the respective annotation input.

Figure 9:
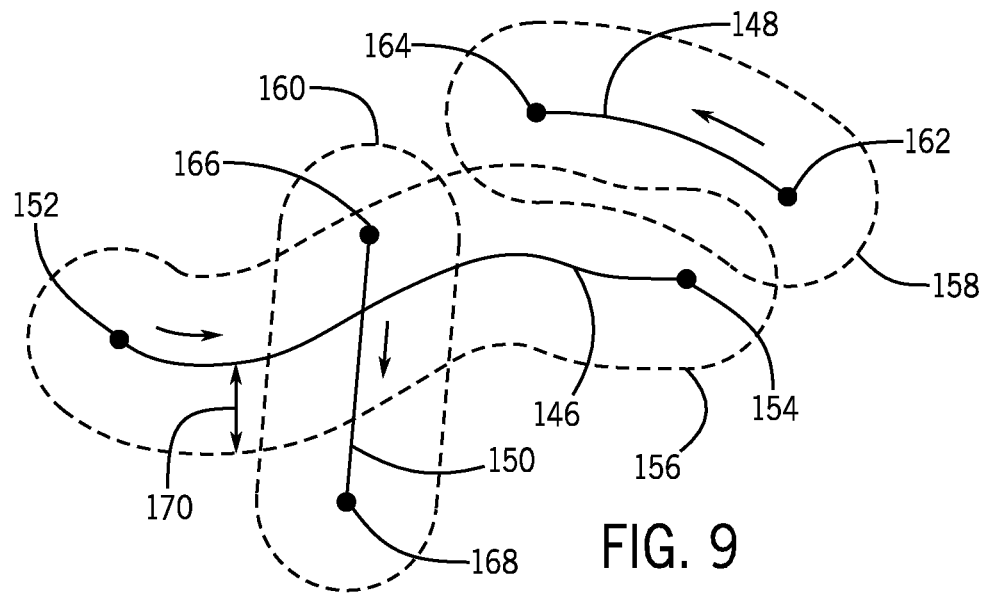
FIG. 9 illustrates examples of paths and padding areas of annotation inputs, in accordance with one or more embodiments of the present disclosure.

FIG. 9 illustrates an example of three paths 146, 148, 150 and their respective padding areas 156, 158, 160. The first path 146 extends between a first touch-down point 152 and a first lift-off point 154, the second path 148 extends between a second touch-down point 162 and a second lift-off point 164, and the third path 150 extends between a third touch-down point 166 and a third lift-off point 168. Each padding area is offset by a padding distance 170 from the respective path. The padding distance 170 may be measured in pixels, inches, millimeters, or another distance measurement. In some embodiments, the padding area for each path extends the padding distance 170 only around the touch-down point and lift-off points. That is, the padding area for a path may be two circular areas around the touch-down and lift-off points. The padding distance 170 for each path may decrease over time based on a functional relationship between the padding distance 170 and a time value for the respective path. The relevant time value for the functional relationship with the padding distance for each path may be the touch-down time or the lift-off time. In some embodiments, the time value is the respective time for each contact point along the path of the respective annotation input. That is, the padding distance 170 near the touch-down point of a path may reach zero prior to the padding distance 170 near the lift-off point of the path reaching zero.

Figure 10:
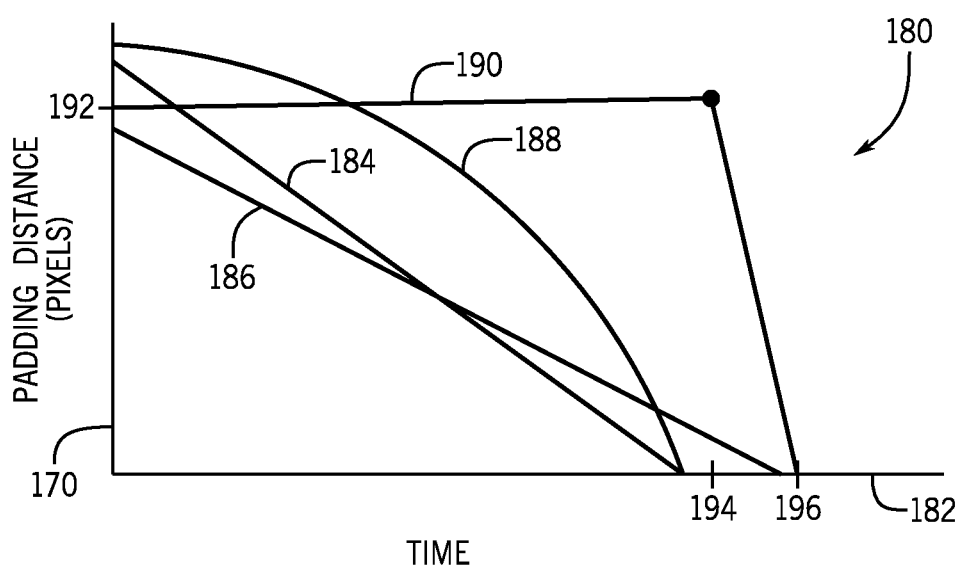
FIG. 10 is a chart illustrating functional relationships between a padding distance around a path of a annotation input and time, in accordance with one or more embodiments of the present disclosure.

The functional relationship between the padding distance 170 and the time value for the respective path may be a continuous function and/or a piecewise function. FIG. 10 illustrates a chart 180 with several exemplary functional relationships between the padding distance 170 and a time value 182 for the respective path. In some embodiments, the padding distance 170 decreases linearly over time, as shown by a first functional relationship 184 and a second functional relationship 186. In some embodiments, the padding distance 170 decreases by a logarithmic functional relationship 188. It may be appreciated that the functional relationship between the padding distance 170 and the time value 182 may be an exponential function, a root function, a polynomial function, and so forth. The padding distance 170 and the time value 182 may be inversely related, such that increasing the time value 182 decreases the padding distance 170. In some embodiments, the padding distance 170 and the time value 182 may be functionally related by a piecewise function 190. For example, the padding distance 170 may have a first value 192 through a first time value 194, then the padding distance 170 decreases to zero at a second time value 196.

It may be appreciated that the starting value for the padding distance 170 and the time value (e.g., time limit) at which the padding distance is zero may be predefined or user adjusted values. Dynamic adjustments during operation of the electronic device to the starting value for the padding distance and/or to the time value at which the padding distance is zero may adjust the sensitivity for grouping annotation inputs into clusters. Furthermore, the starting value for the padding distance may be based at least in part on a screen size of the electronic display 12 that received annotation inputs representing the manual annotations. In some embodiments, the starting value for the padding distance 170 may be approximately 10, 15, 25, 50, or 100 pixels or more. In some embodiments, the time limit of the time value 182 when the padding distance 170 is zero may be 15, 10, 6, 3, or 1 second or less than since the lift-off time of the respective annotation input. For example, the padding distance 170 for a path of an annotation input may decrease from approximately 25 pixels to 0 pixels over 10 seconds since the lift-off time of the respective annotation input. In some embodiments, the time limit of the time value 182 when the padding distance 170 is zero may be a predefined time limit and/or a user-defined time limit.

Returning to the process 130 of FIG. 8, annotation inputs may be grouped into a cluster based on overlapping padding areas (block 133). In some embodiments, a first stylus input may be grouped into a cluster with a second stylus input where only the padding areas for each of the stylus inputs overlap within a specified duration. For example, the first padding area 156 around the first path 146 is shown to overlap with the second padding area 158 near the second path 148 of FIG. 9. However, it may be appreciated that if the second touch-down point 162 and/or generation of the second padding area 158 occurs at a time greater than a predefined time limit (e.g., 10 seconds) after the first lift-off point 154, then the second padding area 158 may not overlap within the specified duration (e.g., time limit). In some embodiments, the functional relationship between the padding distance 170 and the elapsed time after the first-lift off point 154 may reduce the padding distance 170, sometimes down to zero after the elapsed time is greater than the time limit. In such a case, the first padding area 156 would decrease to zero at the time of the second touch-down point 162, resulting in a lack of overlap of the second padding area 158 with the first padding area 156.

In some embodiments, a first annotation input may be grouped into a cluster with a second annotation input where the path of the second annotation input overlaps for a specified duration with the first padding area of the first annotation input while the first padding area is nonzero. For example, the third path 150 is shown to overlap with the first padding area 156 around the first path 146 of FIG. 9, and the third path 150 even crosses the first path 146. However, it may be appreciated that if the third path 150 overlaps the first padding area 156 at a time greater than a time limit after the first lift-off point 154, then the third path 150 may not be determined to overlap with the first padding area 156 that has since decreased to zero. That is, the annotation input for the third path 150 may not be grouped into a cluster with the annotation input for the first path 146, despite the overlapping paths 146 and 150 because the third path 150 occurred too late to be grouped with the first path 146.

Accordingly, for some clustering conditions and sequences of annotation inputs, each of the first path 146, the second path 148, and the third path 150 shown in FIG. 9 may be all grouped together into a cluster. However, for other clustering conditions or sequences of annotation inputs, none of the first path 146, the second path 148, or the third path 150 shown in FIG. 9 may be grouped together into a cluster. Therefore, the determination of the padding areas around the path of each annotation input (block 132) and the comparison of the overlaps of paths and padding areas at moments in time effectively filters the annotation inputs to determine which annotation inputs are to be grouped into a cluster (block 133) based on the clustering conditions.

After grouping each of the annotation inputs into one or more clusters (block 133), the process 130 of FIG. 8 may determine an anchor location or anchor object for each cluster (block 134). As discussed in detail below with FIG. 11, the anchor location for a cluster of one or more annotation inputs may be determined based on a path shape of a annotation input of the cluster, a location of a first (e.g., earliest) annotation input of a cluster, a location of the cluster (e.g., within the body, within the margin), or an average location of the annotation inputs of the cluster, or any combination thereof. Similar to the discussion above with FIG. 6, accurate determination of the anchor location or anchor object for each cluster may enable the cluster to be moved relative to the anchor location or anchor object with subsequent modifications to the document.

The process 130 may generate a flattened image of the manual annotations based on the aggregated paths of annotation inputs in each cluster (block 135). When the annotation inputs are received by the electronic device and manual annotations are initially displayed over the image of the document, the manual annotations may be displayed on multiple layers over the document layer with the image of the document. The flattened image of the manual annotations for the cluster may combine the multiple layers, thereby reducing the quantity of layers displayed by the electronic device 10 and reducing the complexity of the display of the manual annotations over the image of the document. Moving the flattened image of the cluster of the aggregated manual annotations with the anchor location may be easier than separately moving each of the manual annotations of the cluster with the anchor location while preserving the spatial relationships between the manual annotations of the cluster. After generation of the flattened image, the process 130 may display the flattened image of the cluster of manual annotations at an associated location relative to the determined anchor location (block 136). Similar to block 128 in the process 100 of FIG. 7, the process 130 may store the flattened image, associated location, and anchor location as associated annotation data with the document data in memory (block 137). The underlying annotation inputs for the aggregated paths shown by the flattened image may also be stored with the document data, as described above.

As discussed above with process 100 of FIG. 7, subsequent modifications to the document data (block 108) may affect the paths of prior annotation inputs, including clusters of annotation inputs. The process 130 shown in FIG. 8 includes adjustments to the affected paths of a cluster based on inputs to modify the document that affect the paths of one or more annotation inputs of a cluster (block 138). For example, the addition or removal of text or pages to a document may move the anchor location within the document. The process 130 may determine which annotation inputs of the cluster are to be adjusted based on the movement of the anchor location so that the cluster is moved with the anchor location. Appropriate adjustment (e.g., movement, transformation) of the cluster with the anchor location may enable the manual annotation of the cluster to be coherently retained with the appropriate portion of the document.

Figure 11:
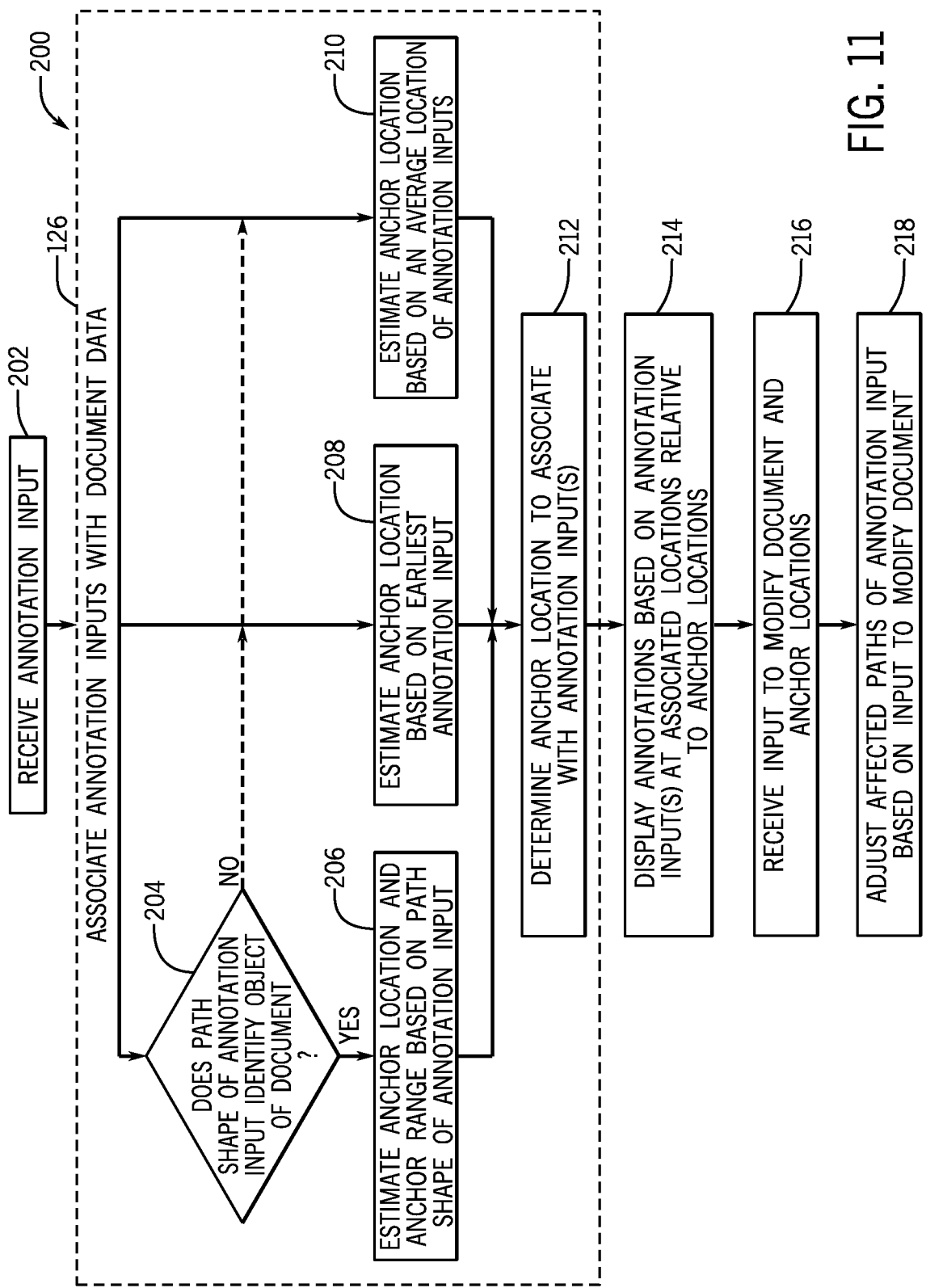
FIG. 11 depicts a process flow diagram depicting control logic for associating annotation inputs with anchor locations relative to objects of the electronic document, in accordance with one or more embodiments of the present disclosure.

FIG. 11 illustrates a process 200 for associating annotation inputs with anchor locations relative to objects of the electronic document and displaying annotations at the anchor locations, in accordance with aspects of the present disclosure. In some embodiments, each annotation may be displayed at an associated location relative to the respective anchor location. In some embodiments, the one or more processors 18 of the electronic device 10 may execute instructions for the process 200. The process 200 includes receiving one or more annotation inputs (block 202) from memory of the electronic device 10 or from the stylus device 40. The process 200 may associate annotation inputs with document data (block 126) to determine the anchor location to be associated with each annotation input or group (e.g., cluster) of annotation inputs based on one or more factors, as described below with blocks 204, 206, 208, 210, and 212.

The processor of the electronic device 10 may analyze the path shape of the received one or more annotation inputs to determine if the path shape identifies an object or text of the document (decision block 204). Path shapes of identifying annotation inputs used to estimate an anchor location may include, but are not limited to, enclosure annotations, arrows, callouts, brackets, underlines, strikethroughs, and symbols, among others.

Figure 14:
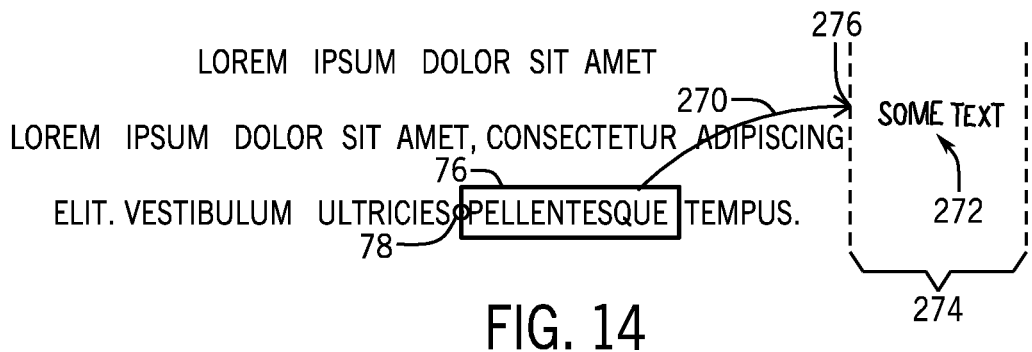
FIG. 14 illustrates an example of an arrow annotation, in accordance with one or more embodiments of the present disclosure.
Figure 15:
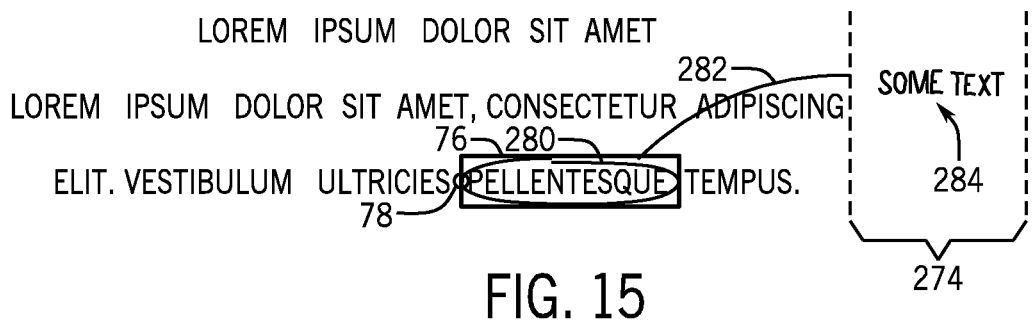
FIG. 15 illustrates an example of a callout annotation, in accordance with one or more embodiments of the present disclosure.

Enclosure annotations may include, but are not limited to a circle, a box, an ellipse, or other shape that at least partially encloses text or an object that corresponds to an anchor location for the annotation input and any clustered annotation inputs. Accordingly, an anchor location and anchor range may be estimated based on the path shape of the annotation input (block 206). For example, an arrow may point to or originate from a location in the document that corresponds to an anchor location for the annotation input and any clustered annotation inputs, as shown in FIG. 14. In FIG. 14, an arrow 270 identifies the word with the anchor location 78 in the text, and the arrow 270 may be clustered with the text comment 272 in the margin 274 at the end point 276 of the arrow 270. In some embodiments, the arrow 270 and end point 276 may be clustered together as a first cluster associated with a first location in the body of the text relative to the anchor location 78 in the text, and the text comment 272 may be clustered together as a second cluster associated with a second location in the margin 274. The first cluster with the arrow 270 and the second cluster with the text comment 272 may be associated with each other, thereby enabling the first cluster and second cluster to be adjusted (e.g., moved) together, as described in detail below. Likewise, callout lines from a body of the document to a margin may point to or originate from a location in the document that corresponds to an anchor location for the annotation input and any clustered annotation inputs. In FIG. 15, an enclosure annotation 280 with a callout line 282 identifies the word with the anchor location 78 in the text. The enclosure annotation 280 also defines the anchor range 76 for the cluster of the enclosure annotation 280, the callout line 282, and the text comment 284 in the margin 274. In some embodiments, the enclosure annotation 280 may be clustered as a first cluster associated with a first location in the body of the text relative to the anchor location 78 in the text, the callout line 282 may be clustered as a second cluster associated with a second location in the body of the text relative to the anchor location 78 and/or enclosure annotation 280, and the text comment 284 may be clustered together as a third cluster associated with a third location in the margin 274. The first, second, and third clusters may be associated with each other, thereby enabling the first, second, and third clusters to be adjusted (e.g., moved, expanded, contracted) together, as described in detail below.

In some embodiments, the ends of a bracket path shape may identify lines or objects of the document that correspond to an anchor location for the annotation input. In some embodiments, a bracket path shape may correspond to an anchor location by identifying an endpoint (e.g., beginning, end) of an anchor range. Underlines may identify an anchor range of text immediately above the underline path shape, and strikethroughs may identify an anchor range of text underneath the strikethrough path shape. Underlines or strikethroughs of multiple lines of a document may be grouped together in one cluster, or in multiple clusters. In some embodiments, the process 200 may distinguish an underline path shape from a strikethrough path shape based at least in part on an average location of the path relative to the image of the text of the document. Path shapes identified as underlines may have the average location below the baseline of the line of text in the image, whereas path shapes identified as strikethroughs may have the average location above the baseline of the line of text in the image.

In some embodiments, the process 200 may estimate the anchor location of a cluster of annotation inputs based on an earliest annotation input of the cluster of annotation inputs (block 208). That is, the first annotation input of a cluster of annotation inputs may be located near to the text or object that the user providing the annotation input intended to associate with the manual annotation. Accordingly, in some embodiments, the anchor location may be associated with the earliest annotation input. In some embodiments, the associated location for an annotation input may be a central point of the annotation input (e.g., callout line, enclosure annotation, arrow), and the annotation input may be displayed at the associated location relative to the anchor location.

In some embodiments, the process 200 may estimate the anchor location of one or more annotation inputs to be at or near an average location based of the one or more paths of the annotation inputs (block 210). For example, a comment written across the edge of the body of text may be evaluated to determine whether the average location of the paths of the annotation input are located within the body or within the margin. Accordingly, the anchor location may be estimated to be within the body if the average location is within the body, and the anchor location may be estimated to be within the margin of the document if the average location is within the margin.

In some embodiments, annotations in the margin of a document may be associated with the nearest object. In some embodiments with documents having text, the anchor location for annotations in the margin of a document may be determined to be the first word or the first sentence of the nearest paragraph. Annotations with an anchor location in the side margin of a document may be constrained vertically within the document so that the annotation does not cover any of the body of the document despite movement of the anchor location vertically within the document. Annotations with an anchor location at the top margin (e.g., header) or bottom margin (e.g., footer) of a page of a document may be anchored to that particular page of the document despite vertical or horizontal movement of text or objects near the annotation.

The process 200 may determine the anchor location to associate with the one or more annotation inputs based on an evaluation of the one or more estimated anchor locations from blocks 206, 208, 210 (block 212). In some embodiments, the process 200 may weigh the estimated anchor locations based on a hierarchy of the blocks 206, 208, and 210. For example, annotation inputs that identify objects of the document (e.g., via enclosure annotations) may be given more weight to determine the anchor location than the earliest annotation input or average location of annotation input paths. In some embodiments, the estimated anchor locations from different analyses may be the same. For example, if the first annotation input is a callout annotation, then the estimated anchor location from the path shape (block 206) and from the earliest annotation input (block 208) will be the same. In some embodiments where the path shape of the annotation input does not clearly identify an object of the document (decision block 204), then the estimated anchor location based on the path shape (block 208) may be given less weight than the earliest annotation input estimate or the average location of paths estimate.

The process 200 may display the manual annotations from the annotation inputs at associated locations relative to the determined anchor locations (block 214) of the document. As discussed above with process 100 of FIG. 7, subsequent modifications to the document data (block 108) may affect the anchor locations of one or more prior annotation inputs, including prior clusters of annotation inputs.

The process 200 shown in FIG. 11 includes receiving input to modify the document and anchor locations (block 216). For example, as discussed above, text and/or objects may be added to the document. In some cases, text and/or objects can be added inside the anchor range for the annotation. The process 200 includes adjustments to the affected paths of a cluster based on inputs to modify the document that affect the paths of one or more annotation inputs of a cluster (block 218). For example, the addition or removal of text or pages to a document may move the anchor location within the document. Additionally and/or alternatively, the paths may be extended, contracted, or otherwise modified.

Figure 12:
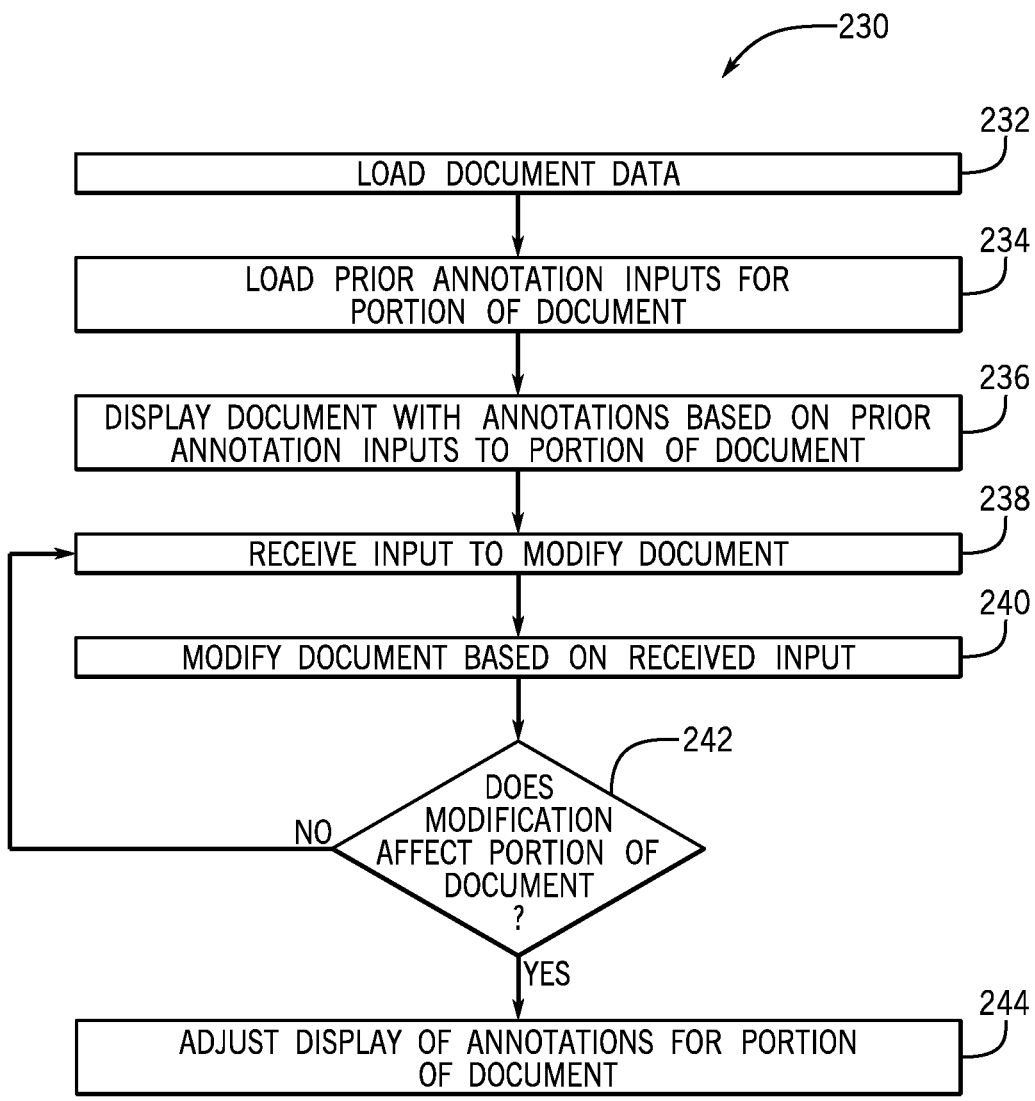
FIG. 12 depicts a process flow diagram depicting control logic for modifying displayed annotations based on modifications to the electronic document, in accordance with one or more embodiments of the present disclosure.

FIG. 12 illustrates a process 230 for modifying (e.g., transforming) displayed annotations for a portion of an electronic document based on modification to the portion of the electronic document, in accordance with aspects of the present disclosure. In some embodiments, the one or more processors 18 of the electronic device 10 may execute instructions for the process 230. It may be appreciated that the process 230 may be performed without the stylus device 40 in communication with the electronic device 10. The process 230 includes loading document data and prior annotation inputs for a portion of a document (block 232 and 234). Similar to block 106 of FIG. 7, the process 230 may display an image representing the document data with manual annotations representing any prior annotation inputs (block 236). The electronic device 10 may receive inputs to modify the document represented by the document data (block 238). The inputs to modify the document may be received by one or more of the input structures 14 (e.g., button, keyboard, mouse, trackpad, touch screen), the network interface of the electronic device 24, or any combination thereof. For example, the inputs may add text or objects (e.g., images, cells, charts, etc.) to the document, remove text or objects from the document, rearrange text or objects within the document, or any combination thereof. The document application that receives the input may modify the document based on the received input (block 240).

At decision block 242, the process 230 determines if the received modification to the document affects the portion of the document with the annotation. If the modification to the document does not affect the portion with the annotation, then the process 230 may return to block 238 to receive additional inputs to modify the document. If the modification to the document does affect the portion of the document with the annotation, then the process 230 adjusts the display of the annotation for that portion of the document (block 244).

For example, if the modification to the portion of the text expands the anchor range with the annotation, the modification to the manual annotation may be to expand the path of the respective annotation input along the anchor range. That is, if the annotation is an enclosure annotation that encircles or underlines several words and the annotation has an anchor range including the several words, then a modification to add words within the anchor range prompts the process 230 to expand the path of the enclosure annotation to encircle or underline the original words and the added words. FIG. 16 illustrates an example of an underline annotation 290 for the anchor range 76 that is adjusted to an expanded underline annotation 290' with the addition of the words "AND THE" within the anchor range 76. In some embodiments, modification to the portion of the text that move the anchor location 78 or expand the anchor range to cause text wrap may affect the annotation. FIG. 17 illustrates an example of a modification to an underline annotation 300 for the anchor range 76, where the added words "AND THE" within the anchor range 76 cause the anchor range to wrap onto the next line. FIG. 17 illustrates an expanded underline annotation 300' that adjusts the manual annotation to be visibly applied to the original text within the anchor range 76 and the added words.

Figure 13:
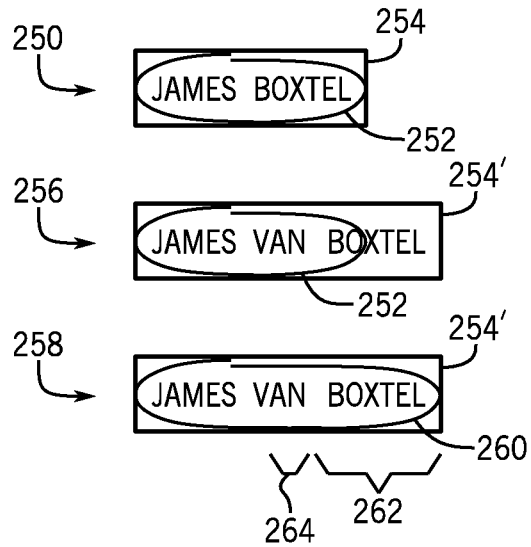
FIG. 13 illustrates an example of modification of displayed annotations for a portion of an electronic document based on modification to the portion of the electronic document, in accordance with one or more embodiments of the present disclosure.
Figure 18:
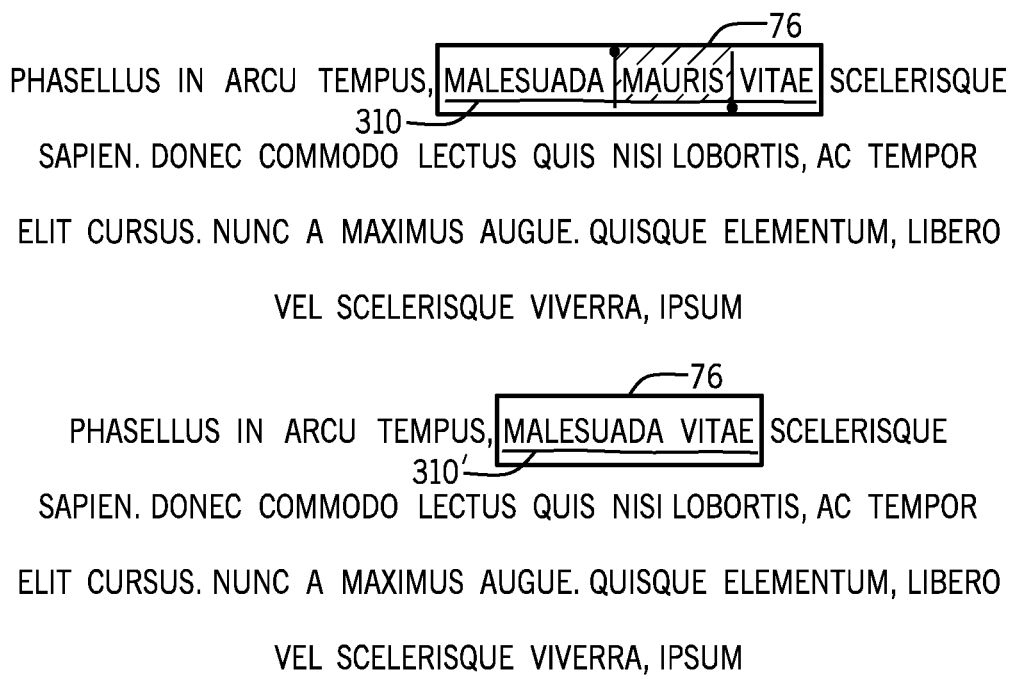
FIG. 18 illustrates an example of an underline annotation that is contracted, in accordance with one or more embodiments of the present disclosure.

FIG. 13 illustrates an example of an enclosure annotation that is expanded in conjunction with an expansion to the underlying document data. A first line 250 shows an enclosure annotation 252 that encircles the text "james boxtel" and has an anchor range 254 from the left of the "J" of "JAMES" to the right of the "L" of "BOXTEL." The second line 256 illustrates a modification to expand the underlying text to "JAMES VAN BOXTEL." This added text is within the original anchor range, and thus expands the anchor range 254'. However, the unmodified first enclosure annotation shown in the second line 256 does not encircle the expanded text "JAMES VAN BOXTEL" within the expanded anchor range 254'. However, upon modification of the enclosure annotation, as illustrated in the third line 258, an adjusted enclosure annotation 260 encircles the expanded text "JAMES VAN BOXTEL." In some embodiments, the enclosure annotation is expanded by moving a part 262 of the enclosure annotation 252 and adding a portions 264 of the path to retain continuity of the adjusted enclosure annotation 260 with regard to the expanded anchor range 254'. The added portions 264 of the path of the adjusted enclosure annotation 260 may be added to the path of the annotation input for the original enclosure annotation 252, thereby dynamically updating the annotation input with the modification to the document data.

Where modification to the portion of the text contracts the anchor range with the annotation, the modification may be to contract the path of the respective annotation input along the anchor range. That is, if the annotation is a strikethrough annotation that strikes through five words and the annotation has an anchor range including the five words, then a modification to remove three of the words within the anchor range prompts the process 230 to contract the path of the strikethrough annotation to only strikethrough the two remaining original words. Continuing this example, if the modification removes all five of the original words (thus causing the anchor range of the document to be null), then the modification to the annotation may be the removal of the entire strikethrough annotation. FIG. 18 illustrates an example of an underline annotation 310 for the anchor range 76 that is adjusted to a contracted underline annotation 310' with the removal of the word "MAURIS" within the anchor range 76.

In some embodiments, the modification to the portion of the document moves the anchor location. Where the modification moves the anchor location for an annotation with a callout or an arrow annotation, the process 230 may expand, contract, or rearrange the path between endpoints of the callout or arrow annotation. FIG. 19 illustrates an example of a callout 320 from an enclosure annotation 322 to a margin comment 324. A modification to the text that moves the anchor location on the word "MASSA" to the next line may cause the process 230 to modify the callout, as shown by the modified callout 320'. In some embodiments, the process 230 may modify the middle portion of the callout or arrow annotation to reduce coverage of text or images of the document data. In some embodiments, the process may move a cluster of one or more annotation inputs from a left margin to a right margin, or vice versa, in response to a modification of the document that moves the anchor location for the cluster.

FIGS. 20A-20D illustrates an example of two annotations associated with text box objects of a document. FIG. 20A illustrates a comment annotation 330 that is anchored in an associated location relative to the anchor location 78 on the left edge of a first text box 332. The first text box 332 and a linked second text box 338 are objects located within a body 340 of text of the document. An enclosure annotation 336 is anchored to the text "CONVALLIS" within the first text box 332. FIG. 20B illustrates movement of the first text box 332 a first distance 334 to the right, which also moves the comment annotation 330 to be within the body 340. Addition of the text "DOME" to the final line of the first text box 332 in FIG. 20B pushes/wraps the text "CONVALLIS" to a second text box 338 that is linked to the first text box 332. Accordingly, the enclosure annotation 336 moves with the anchored text "CONVALLIS" to the second text box 338. FIG. 20B illustrates that the text of the body 340 of the document may wrap around the first text box 332 and the comment annotation 330. In some embodiments, the text of the body 340 of the document may wrap around the first text box 332, but not the comment annotation 330, such that the comment annotation 330 is displayed over a portion of the text of the body 340 of the document as illustrated in FIG.

20C. Moreover, in some embodiments, the comment annotation 330 may be associated with the first text box 332 and the anchor location 78, but the comment annotation 330 is anchored outside the body of the text of the document, as illustrated in FIG. 20D.

The specific embodiments described above have been shown by example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. For example, while the discussion herein described a function with a first search attribute and a second modal attribute, any number and type of attributes may be processed using the techniques provided herein.

What is claimed is:

1. A tangible, non-transitory, machine-readable medium, comprising machine-readable instructions that when executed by one or more processors, cause the one or more processors to:
   group one or more annotation inputs into one or more clusters by:
   determining a padding area around a respective path for each of the one or more annotation inputs based on a function relating a padding distance and an elapsed time since a lift-off event of the respective annotation input; and
   grouping each set of the one or more annotation inputs having overlapping padding areas into a respective cluster of the one or more clusters;
   associate each of the one or more clusters with an object of one or more objects of document data; and
   display annotations on a graphical representation of the one or more objects, wherein each displayed annotation corresponds to a cluster of the one or more clusters.

2. The machine-readable medium of claim 1, comprising machine-readable instructions that, when executed by the one or more processors, cause the one or more processors to adjust the padding distance in response to a user input.

3. The machine-readable medium of claim 1, comprising machine-readable instructions that, when executed by the one or more processors, cause the one or more processors to associate a first cluster of the one or more clusters with a first anchor location of the graphical representation, wherein the first anchor location corresponds to a first object of the one or more objects within the graphical representation.

4. The machine-readable medium of claim 3, comprising machine-readable instructions that, when executed by the one or more processors, cause the one or more processors to:
   receive input to move the first object a first distance within the graphical representation;
   move the first anchor location the first distance within the graphical representation; and
   move the annotations corresponding to the first cluster with the first anchor location.

5. The machine-readable medium of claim 1, comprising machine-readable instructions that, when executed by the one or more processors, cause the one or more processors to:
   anchor a first cluster of the one or more clusters to a first object of the one or more objects within the graphical representation, wherein the first object comprises a range of text;
   receive input to add characters or to remove characters within the range of text of the first object; and
   expand a path of a respective annotation input of the first cluster if the input adds characters within the range of text or contract a path of a respective annotation input of the first cluster if the input removes characters within the range of text.

6. A processor-implemented method for processing annotation inputs, comprising:
   receiving annotation inputs, wherein each of the annotation inputs comprises a path defined by a corresponding touch-down event and lift-off event relative to an image shown on a display;
   determining a padding area around the path for each annotation input, wherein the padding area for each annotation input is based on a function relating a padding distance and an elapsed time since the lift-off event of the respective annotation input;
   identifying annotation inputs with overlapping padding areas;
   grouping annotation inputs with overlapping padding areas into a cluster; and
   displaying, at an associated location relative to an anchor location within the image the cluster as an annotation comprising an aggregated path of each respective annotation input of the cluster.

7. The processor-implemented method of claim 6, wherein the function comprises a continuous function that inversely relates the padding distance with the elapsed time.

8. The processor-implemented method of claim 6, wherein the padding distance is zero pixels when the elapsed time is greater than or equal to a predefined time limit.

9. The processor-implemented method of claim 6, comprising anchoring the cluster to an object at the associated location relative to the anchor location within the image, wherein the object comprises an anchor range defined by the path of an identifying annotation input of the annotation inputs grouped into the cluster.

10. The processor-implemented method of claim 9, wherein the path of the identifying annotation input comprises an underline, a strikethrough, or an enclosure.

11. The processor-implemented method of claim 9, comprising:
    expanding the path of the identifying annotation input of the cluster when characters are added within the anchor range; or
    contracting the path of the identifying annotation input of the cluster when characters are removed from the anchor range.

12. The processor-implemented method of claim 6, comprising determining the anchor location based on an average location within the image of the aggregated path of the annotation inputs of the cluster and a body region of the image, wherein the anchor location comprises a location of an object within the body region when the average location is within the body region.

13. A tangible, non-transitory, machine-readable medium, comprising machine-readable instructions that when executed by one or more processors, cause the one or more processors to:
    display an image of a document via a display of an electronic device;
    display first annotations associated with a first portion of the document via the display of the electronic device, wherein the first annotations correspond to a cluster of annotation inputs formed based at least in part on overlapping padding areas around one or more first paths of the annotation inputs, wherein each of the padding areas of the annotation inputs is determined based on a function relating a padding distance and an elapsed time since a lift-off event of a respective annotation input;
receive input to:
  move the first portion within the document;
  expand the first portion of the document; or
  contract the first portion of the document;
adjust the first portion of the document based on the received input; and
adjust the display of the first annotations for the first portion of the document based at least in part on the received input to modify the first portion of the document, by:
  moving one or more first paths of the first annotations;
  expanding one or more first paths of the first annotations;
  contracting one or more first paths of the first annotations; or
  any combination thereof.

14. The machine-readable medium of claim 13, wherein the first annotations are associated with the first portion of the document based at least in part on:
  a path shape of one or more identifying annotation inputs of the annotation inputs;
  an earliest annotation input of the annotation inputs; or
  any combination thereof.

15. The machine-readable medium of claim 13, comprising machine-readable instructions that when executed by the one or more processors, cause the one or more processors to:
  receive second annotation inputs;
  associate the second annotation inputs with a second portion of the document, wherein each annotation input of the second annotation inputs comprises a respective second path; and
  display second annotations on the display within the second portion of the document, wherein the second annotations correspond to the respective second paths of the second annotation inputs.

16. A processor-implemented method for processing annotation inputs, comprising:
  displaying an image of a document via a display of an electronic device;
  grouping a first group of annotation inputs into a first cluster by:
    determining a padding area around a respective path for each of the annotation inputs based on a function relating a padding distance and an elapsed time since a lift-off event of the respective annotation input; and
    grouping one or more annotation inputs having overlapping padding areas into the first cluster;
  associating the first group of annotation inputs with a first associated location relative to a first anchor location of the image of the document based at least in part on:
    a path shape of one or more identifying annotation inputs of the first group of annotation inputs;
    an earliest annotation input of the first group of annotation inputs;
    an average location within the image of the paths of the annotation inputs of the first group of annotation inputs; or
    a combination thereof; and
  displaying first annotations for the first group of annotation inputs via the display of the electronic device at the first associated location, wherein the displayed first annotations correspond to the first cluster.

17. The processor-implemented method of claim 16, comprising:
  associating a second group of annotation inputs to a second anchor location of the image of the document based at least in part on a second location of the second group of annotation inputs, wherein the second location corresponds to an average location of second paths of the second group of annotation inputs that is in a header of the image of the document or a footer of the image of the document;
  displaying second annotations for the second group of annotation inputs via the display of the electronic device at the second anchor location;
  receiving input to move one or more objects of the document relative to the second anchor location; and
  maintaining the second anchor location for the second group of annotation inputs despite the received input to modify the document.

18. The machine-readable medium of claim 1, wherein the function comprises a continuous function that inversely relates the padding distance with the elapsed time.

19. The machine-readable medium of claim 13, wherein the function comprises a continuous function that inversely relates the padding distance with the elapsed time.

20. The processor-implemented method of claim 16, wherein the function comprises a continuous function that inversely relates the padding distance with the elapsed time.

* * * * *